US011461390B2

(12) United States Patent
Cremer et al.

(10) Patent No.: US 11,461,390 B2
(45) Date of Patent: *Oct. 4, 2022

(54) AUTOMATED COVER SONG IDENTIFICATION

(71) Applicant: Gracenote, Inc., Emeryville, CA (US)

(72) Inventors: Markus K. Cremer, Orinda, CA (US);
Zafar Rafii, Berkeley, CA (US);
Robert Coover, Orinda, CA (US);
Prem Seetharaman, Chicago, IL (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/065,479

(22) Filed: Oct. 7, 2020

(65) Prior Publication Data
US 2021/0034665 A1  Feb. 4, 2021

Related U.S. Application Data

(63) Continuation of application No. 15/698,557, filed on Sep. 7, 2017, now Pat. No. 10,803,119.

(Continued)

(51) Int. Cl.
*G06F 16/683* (2019.01)
*G06Q 50/18* (2012.01)

(52) U.S. Cl.
CPC ......... *G06F 16/683* (2019.01); *G06Q 50/184* (2013.01)

(58) Field of Classification Search
CPC .... G06F 16/176; G06F 21/575; G06F 16/683; G06Q 50/184

(Continued)

(56) References Cited

U.S. PATENT DOCUMENTS 7,185,201 B2   2/2007   Rhoads et al.
7,797,249 B2   9/2010   Schmelzer et al.
(Continued)

OTHER PUBLICATIONS

United States Patent and Trademark Office, "Non-Final Office Action," issued in connection with U.S. Appl. No. 15/698,532 dated Nov. 15, 2019, 7 pages.

(Continued)

*Primary Examiner* — Kuen S Lu
(74) *Attorney, Agent, or Firm* — Hanley, Flight & Zimmerman, LLC

(57) ABSTRACT

Example systems and methods for automated cover song identification are disclosed. An example apparatus includes memory, and one or more processors to execute instructions to identify query audio from a content source based on a search query using rights metadata associated with the query audio, execute a constant Q transform on query time slices of the query audio, binarize the constant Q transformed query time slices, execute a two-dimensional Fourier transform on query time windows within the binarized and constant Q transformed query time slices to generate two-dimensional Fourier transforms of the query time windows, generate a query data structure based on a sequential order of the two-dimensional Fourier transforms, select a subset including reference audio of a reference database based on the rights metadata, and identify the query audio as a cover rendition of the reference audio based on a comparison between the query and reference data structures.

24 Claims, 13 Drawing Sheets

Related U.S. Application Data

(60) Provisional application No. 62/441,469, filed on Jan. 2, 2017.

(58) Field of Classification Search
USPC ........................................................ 707/730
See application file for complete search history.

(56) References Cited

U.S. PATENT DOCUMENTS

| | | | |
|---|---|---|---|
| 7,848,540 B2 | 12/2010 | Srinivasan et al. | |
| 8,584,197 B2 | 11/2013 | King et al. | |
| 8,584,198 B2 | 11/2013 | King et al. | |
| 9,218,540 B2 | 12/2015 | Thapliya et al. | |
| 9,299,364 B1 | 3/2016 | Pereira et al. | |
| 9,384,272 B2 | 7/2016 | Bertin-Mahieux et al. | |
| 9,880,805 B1* | 1/2018 | Guralnick | G06F 3/0482 |
| 2007/0297784 A1* | 12/2007 | Wong | G03B 3/02 396/89 |
| 2009/0083228 A1 | 3/2009 | Shalz et al. | |
| 2011/0058685 A1* | 3/2011 | Sagayama | G10L 21/0272 381/98 |
| 2013/0132077 A1* | 5/2013 | Mysore | G10L 21/028 704/233 |
| 2013/0226957 A1 | 8/2013 | Ellis et al. | |
| 2014/0180674 A1 | 6/2014 | Neuhauser et al. | |
| 2014/0185815 A1* | 7/2014 | Roblek | G06F 16/638 381/56 |
| 2014/0366710 A1 | 12/2014 | Eronen et al. | |
| 2015/0094835 A1* | 4/2015 | Eronen | G06F 3/165 700/94 |
| 2015/0220631 A1 | 8/2015 | Sherman | |
| 2015/0302086 A1 | 10/2015 | Roberts et al. | |
| 2016/0012857 A1* | 1/2016 | Leppanen | G10L 21/055 386/241 |
| 2018/0165142 A1* | 6/2018 | Harutyunyan | G06F 11/3476 |

OTHER PUBLICATIONS

United States Patent and Trademark Office, "Notice of Allowance," issued in connection with application No. U.S. Appl. No. 15/698,532 dated Mar. 5, 2020, 5 pages.

U.S. Appl. No. 62/099,399, "Approaches for Recognizing Live Performances," filed Jan. 2, 2015, 21 pages.

Seetharaman et al., "Cover Song Identification With 2D Fourier Transform Sequences," Acoustics, Speech and Signal Processing (ICASSP), 2017 IEEE International Conference on Mar. 5-9, 2017, 5 pages.

Zafar Rafii, "Live Music Recognition at Gracenote," http://www.gracenote.com/live-music-recognition-gracenote/, Feb. 23, 2017, 8 pages.

United States Patent and Trademark Office, "Non-Final Office Action," issued in connection with U.S. Appl. No. 15/698,557 dated Jan. 24, 2020, 14 pages.

United States Patent and Trademark Office, "Notice of Allowance," issued in connection with U.S. Appl. No. 15/698,557 dated Jun. 17, 2020, 13 pages.

* cited by examiner

AUTOMATED COVER SONG IDENTIFICATION

RELATED APPLICATION

This patent arises from a continuation of U.S. patent application Ser. No. 15/698,557, (now U.S. Pat. No. 10,803, 119) which was filed on Sep. 7, 2017, which claims the benefit of the filing date of U.S. Provisional Patent Application No. 62/441,469, which was filed on Jan. 2, 2017. U.S. patent application Ser. No. 15/698,557 and U.S. Provisional Patent Application No. 62/441,469 are hereby incorporated herein by reference in their entireties. Priority to U.S. patent application Ser. No. 15/698,557 and U.S. Provisional Patent Application No. 62/441,469 is hereby claimed.

TECHNICAL FIELD

The subject matter disclosed herein generally relates to the technical field of special-purpose machines that facilitate audio identification, including software-configured computerized variants of such special-purpose machines and improvements to such variants, and to the technologies by which such special-purpose machines become improved compared to other special-purpose machines that facilitate audio identification. Specifically, the present disclosure addresses systems and methods to facilitate identification of audio stored in a content repository.

BACKGROUND

A machine may be configured to interact with one or more users by identifying audio (e.g., audio content, such as a song, which may be a cover rendition of an original song or other reference song), for example, in response to a request for identification of the audio. One approach is to configure the machine to perform audio fingerprinting, with an aim towards identifying an audio recording given a sample of it, by comparing a query fingerprint of the sample against a reference fingerprint stored in a database and attempting to find a match. Audio fingerprinting typically involves identifying exact renditions of reference audio (e.g., reference songs), often in complex audio scenes. Audio fingerprinting systems are usually designed to be robust to audio degradations (e.g., encoding artifacts, equalization variations, or noise). However, audio fingerprinting systems typically consider cover versions (e.g., a live performance by a different artist) to be different songs.

BRIEF DESCRIPTION OF THE DRAWINGS

Some embodiments are illustrated by way of example and not limitation in the figures of the accompanying drawings.

DETAILED DESCRIPTION

Figure 1:
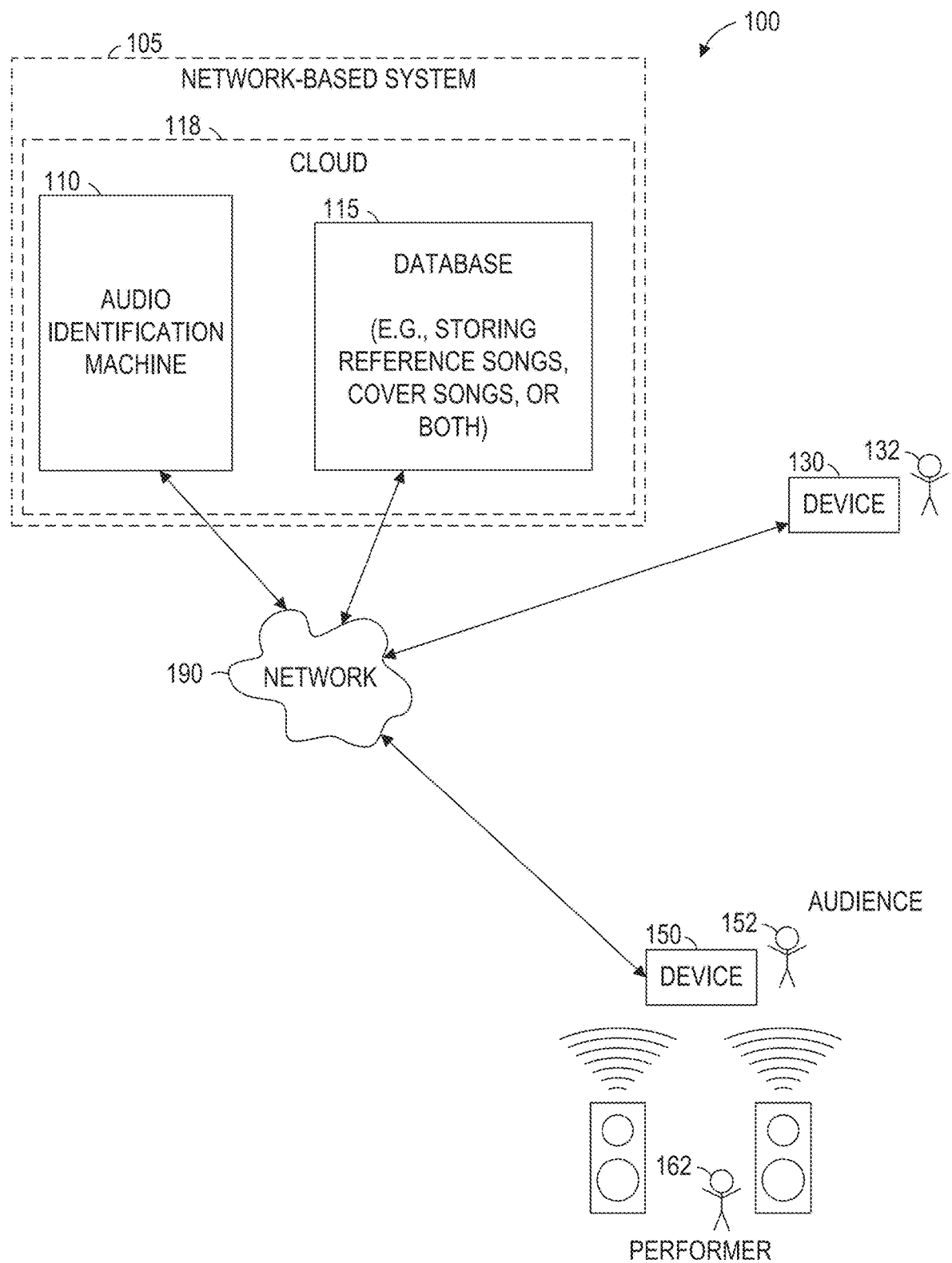
FIG. 1 is a network diagram illustrating a network environment suitable for audio identification based on a data structure, according to some example embodiments.

Example methods (e.g., algorithms) facilitate audio identification based on a data structure, and example systems (e.g., special-purpose machines configured by special-purpose software) are configured to facilitate automated cover song identification. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

One or more audio pieces (e.g., musical pieces or spoken word pieces) may be performed during a live performance. For example, one or more songs may be performed, and a song may be performed with or without visual accompaniment (e.g., a video, a laser show, or a dance routine). In some situations, the performer of an audio piece is an artist that recorded the audio piece (e.g., as a studio recording or as a live recording). For example, a performer may perform a song that she wrote and recorded herself. In other situations, the performer of an audio piece is different from the artist that recorded the audio piece (e.g., as a studio recording or as a live recording). For example, a performer may perform a cover rendition of a song that was written and recorded by someone else.

Typically, cover identification systems aim to identify a song when given an alternate rendition of it (e.g., live, remaster, or remix). A cover version generally retains the same melody as an original rendition of the song, but differs from the original rendition in other musical aspects (e.g., instrumentation, key, or tempo). Cover song identification systems may attempt to identify when two different musical recordings are derived from the same music composition (e.g., Jimi Hendrix's "All Along the Watchtower" is a cover of the original by Bob Dylan). The cover of a song can be drastically different from the original recording, for at least the reason that it can change key, tempo, instrumentation, or musical structure. Automatic identification of cover songs typically involves representing the audio in a manner that is robust to any of the above discussed transformations.

Cover song identification may share some similarities with live song identification, since a live song may be a cover song. In live song identification, a typical task is to recognize a live song (e.g., at a concert) performed by a performer who may or may not be the original artist. In addition, there may be key variation, slight tempo variation, musical structure changes (e.g., for an artist that is known to improvise), or any suitable combination thereof. The audio signal may also be degraded (e.g., due to crowd noise or a bad microphone).

Automated cover song identification can provide various benefits as part of a copyright management system. In some jurisdictions, such as the United States, musicians have had the right to record a version of someone else's previously recorded and released tune, whether it is music alone or music with lyrics. A license can be negotiated between representatives of the interpreting artist and the copyright holder, or recording published tunes can fall under a mechanical license whereby the recording artist pays a standard royalty to the original author/copyright holder through an organization such as the Harry Fox Agency. A variety of complex software offerings attempt to track and manage the licensing of protected works.

With the proliferation of online music and video sharing sites, tracking and managing the licensing of protected works manually is extremely difficult. Online content repositories may provide access to several million files and thousands of hours of audio content, some of which can include unlicensed cover songs. In cover song identification, a typical task is to recognize a recorded song performed by a performer who is not the original artist and posted or uploaded to an online content repository. In the cover, there may be key variation, slight tempo variation, musical structure changes (e.g., for an artist that is known to improvise), or any suitable combination thereof. The audio signal may also be degraded (e.g., due a non-professional quality microphone or webcam). A rights holder may have to first discover where the audio content is located in an online content repository as well as determine whether the audio content is a cover song of a protected work.

According to the systems and methods described herein, audio may be represented using a sequence of two-dimensional (2D) Fourier transforms (2DFTs), and such a sequence may be used by a specially configured machine to perform audio identification (e.g., cover song identification). Such systems and methods are robust to timbral changes (e.g., instrumentation changes), time skews (e.g., small local tempo deviations), and pitch skews (e.g., key changes). In particular, a special data structure provides a time-series representation of audio, and this time-series representation is robust to key changes, timbral changes, and small local tempo deviations. Accordingly, the systems and methods described herein analyze cross-similarity between these time-series representations. In some example embodiments, such systems and methods extract features (e.g., sequences of 2DFTs) from audio fingerprints and calculate a distance measure between audio fingerprints in a manner that is robust and invariant to changes in musical structure.

According to the systems and methods described herein, automated cover song identification can be incorporated into a copyright management system, a digital rights management system, or other licensing management system. Such systems and methods receive metadata about artists, songs, lyrics, publishers, and the like, associated with one or more protected works. The systems and methods can use the metadata (e.g., retrieved from a rights database) to search one or more content repositories (e.g., online or offline). The systems and method can also use the metadata to partition a search space improving identification performance. The systems and methods can identify audio content (e.g., music files, video files, etc.) retrieved from a content repository that potentially includes a cover of a protected work. The systems and methods can detect whether the audio content is a cover of the protected work even when the audio content is not the exact as one or more expressions of the protected work. Such systems and methods are robust to timbral changes (e.g., instrumentation changes), time skews (e.g., small local tempo deviations), and pitch skews (e.g., key changes) in the audio stored in the content repository.

In particular, the systems and methods provide a special data structure having a time-series representation of audio associated with a protected work, and this time-series representation is robust to key changes, timbral changes, and small local tempo deviations that can occur in audio content retrieved from the online content repository that includes a cover of the protected work. Accordingly, the systems and methods described herein generate a candidate list of potential cover songs found within one or more content repositories. A right holder or designated representative can then more easily review the candidate list of potential cover songs without having to search each repository manually.

A. Cover Song Identification

FIG. 1 is a network diagram illustrating a network environment 100 suitable for audio identification based on a data structure, according to some example embodiments. The network environment 100 includes an audio identification machine 110, a database 115, and devices 130 and 150, all communicatively coupled to each other via a network 190. The audio identification machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The audio identification machine 110 and the devices 130 and 150 may each be implemented in a special-purpose (e.g., specialized) computer system, in whole or in part, as described below with respect to FIG. 13. As shown, the database 115 may store reference audio (e.g., reference songs), query audio (e.g., cover songs), various metadata (e.g., identifiers) thereof, or any suitable combination thereof.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

In addition, FIG. 1 illustrates a performer 162. In some situations, the performer 162 is an artist that recorded an audio piece (e.g., as a studio recording or as a live recording). In other situations, the performer 162 is different from the artist that recorded the audio piece (e.g., as a studio recording or as a live recording). For example, a performer 162 may perform a cover rendition of a song that was written and recorded by someone else.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 13, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the audio identification machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
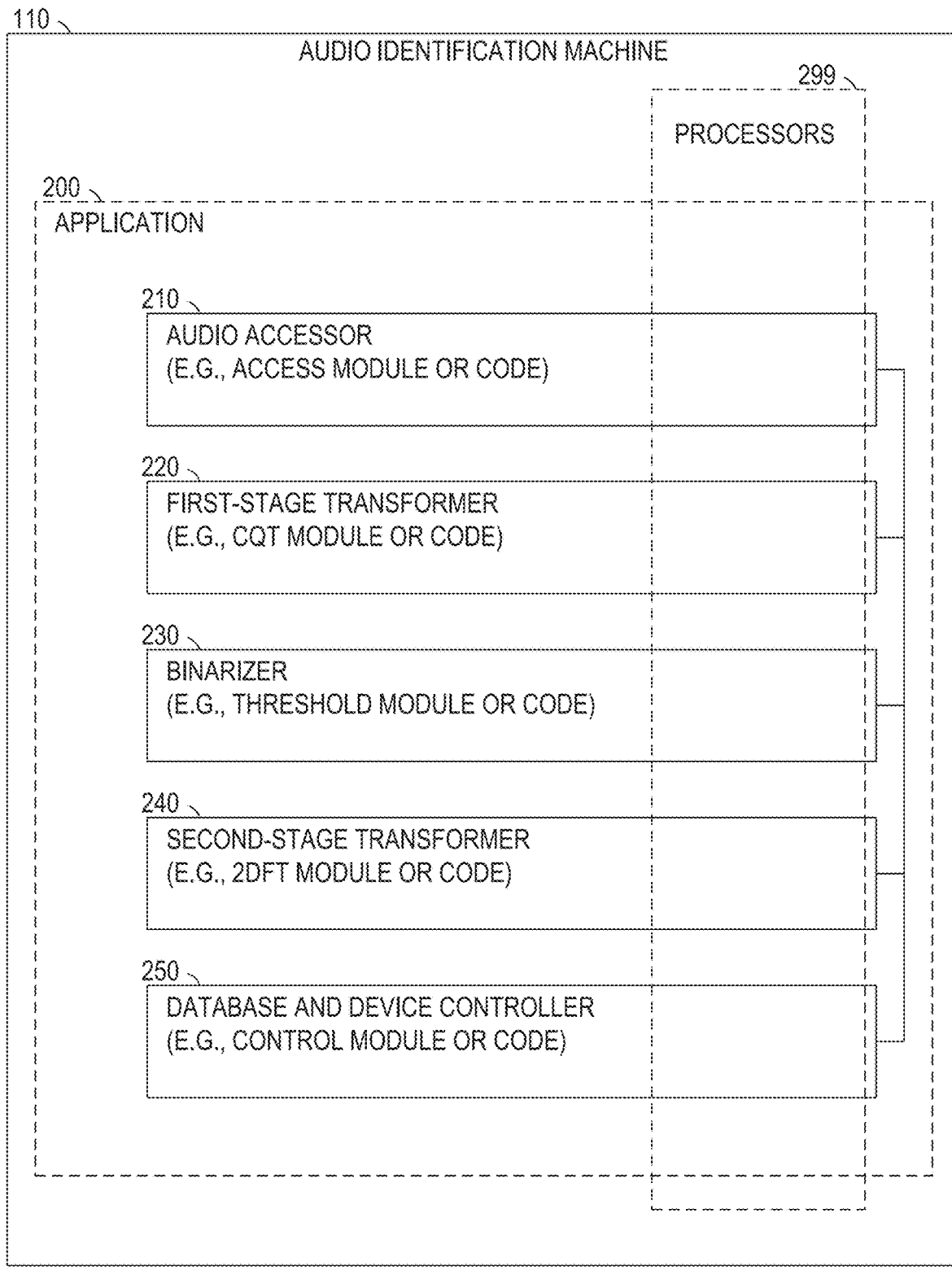
FIG. 2 is a block diagram illustrating components of an audio identification machine suitable for audio identification based on a data structure, according to some example embodiments.

FIG. 2 is a block diagram illustrating components of the audio identification machine 110, according to some example embodiments. The audio identification machine 110 is shown as including an audio accessor 210 (e.g., an access module or other accessing code), a first-stage transformer 220 (e.g., a constant Q transform (CQT) module or other CQT code), a binarizer 230 (e.g., an adaptive threshold module or other adaptive thresholding code), a second-stage transformer (e.g., a 2DFT module or other 2DFTcode), and a database and device controller 250 (e.g., a control module or other controller code), all configured to communicate with each other (e.g., via a bus, shared memory, or a switch).

As shown in FIG. 2, the audio accessor 210, the first-stage transformer 220, the binarizer 230, the second-stage transformer, and the database and device controller 250 may form all or part of an application 200 (e.g., a server application) that is stored (e.g., installed) on the audio identification machine. Furthermore, one or more processors 299 (e.g., hardware processors, digital processors, or any suitable combination thereof) may be included (e.g., temporarily or permanently) in the application 200, the audio accessor 210, the first-stage transformer 220, the binarizer 230, the second-stage transformer, the database and device controller 250, or any suitable combination thereof.

Figure 3:
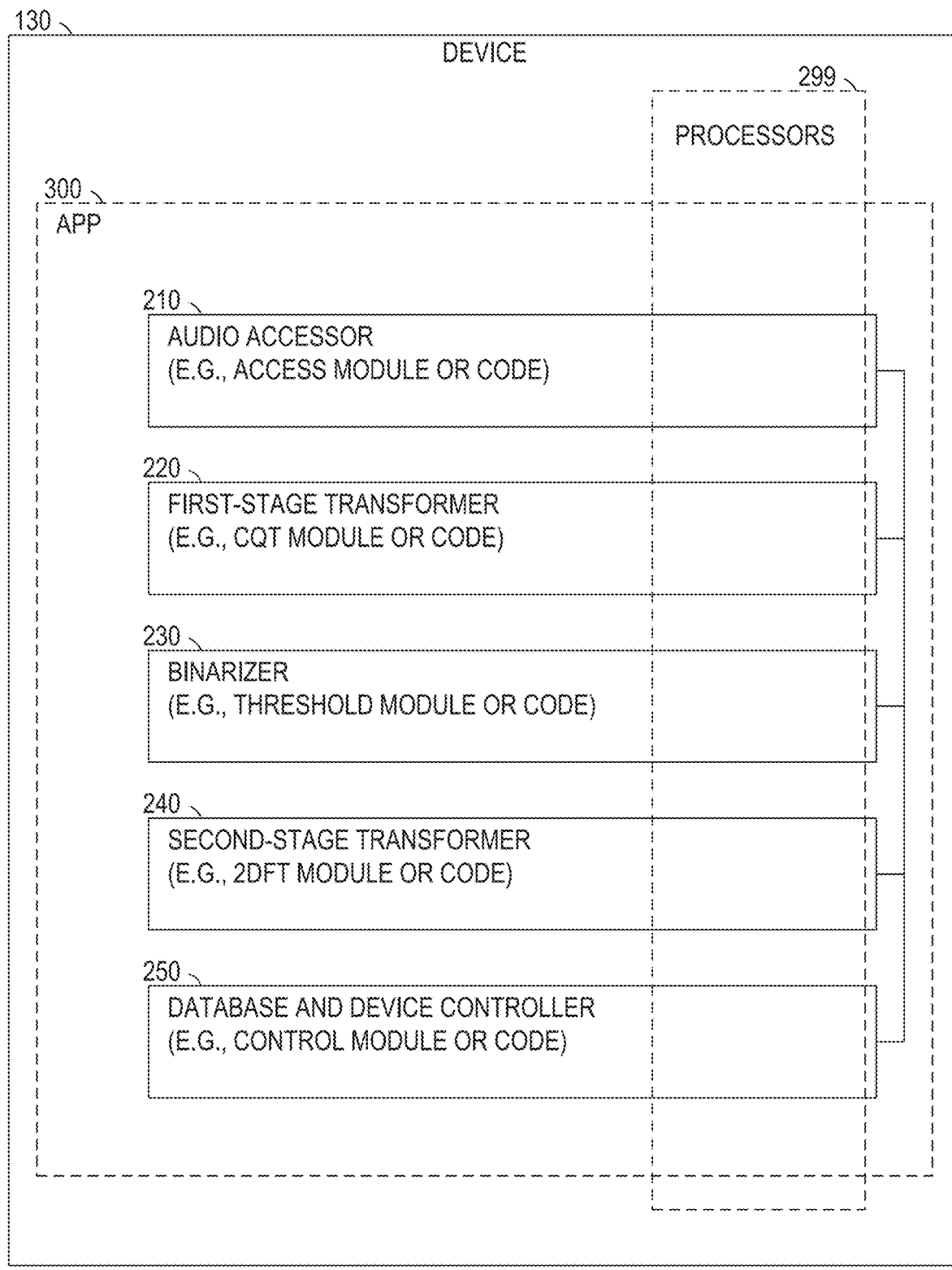
FIG. 3 is a block diagram illustrating components of a device suitable for audio identification based on a data structure, according to some example embodiments.

FIG. 3 is a block diagram illustrating components of the device 130, according to some example embodiments. According to various example embodiments, the device 150 may be similarly configured.

As shown in FIG. 3, the audio accessor 210, the first-stage transformer 220, the binarizer 230, the second-stage transformer, and the database and device controller 250 may form all or part of an app 300 (e.g., a mobile app) that is stored (e.g., installed) on the device 130 (e.g., responsive to or otherwise as a result of data being received from the device 130 via the network 190). Furthermore, one or more processors 299 (e.g., hardware processors, digital processors, or any suitable combination thereof) may be included (e.g., temporarily or permanently) in the app 300, the audio accessor 210, the first-stage transformer 220, the binarizer 230, the second-stage transformer, the database and device controller 250, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 4:
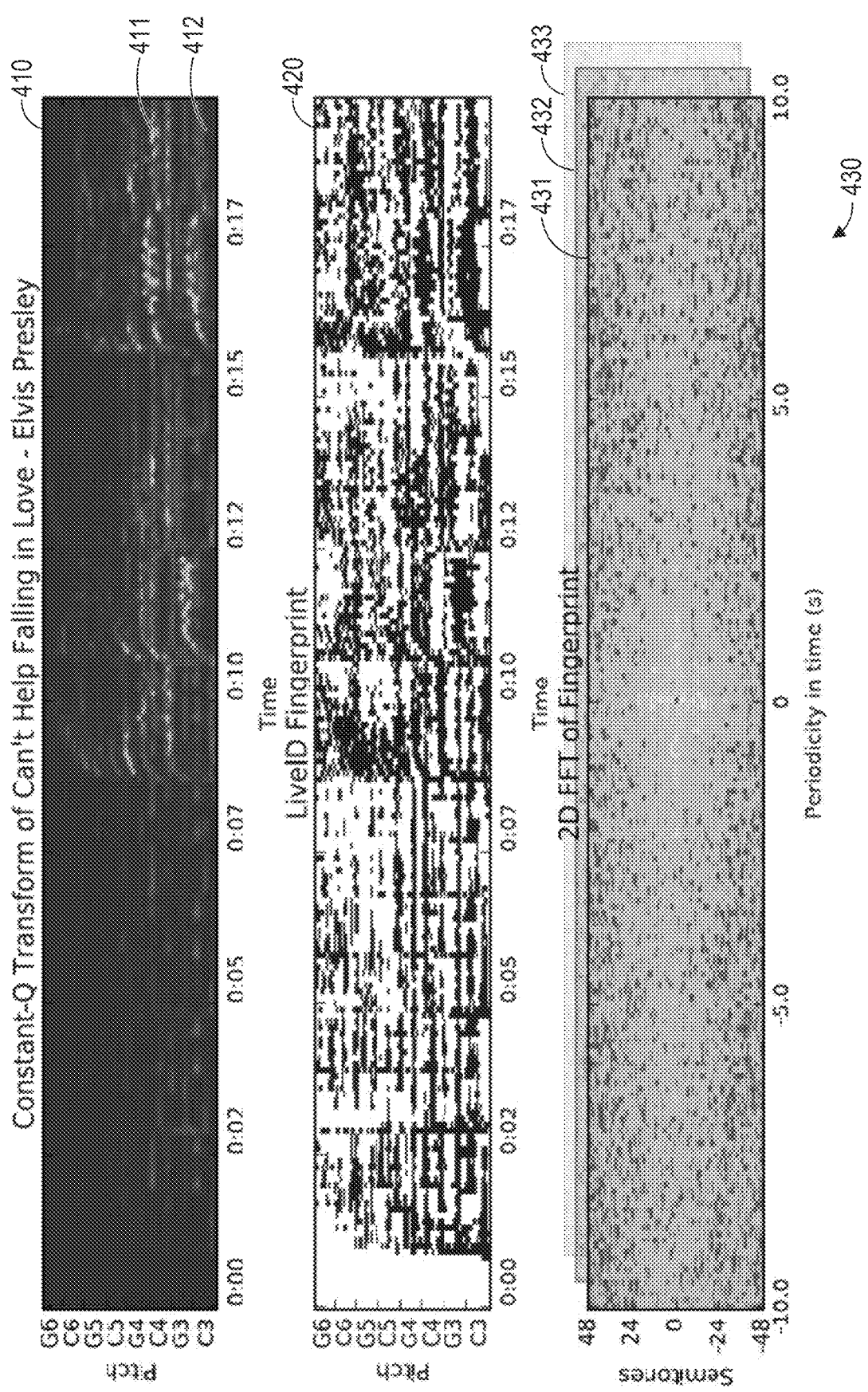
FIG. 4 is a conceptual diagram illustrating representation of audio by a data structure, according to some example embodiments.

FIG. 4 is a conceptual diagram illustrating representation of audio (e.g., reference audio or query audio) by a data structure, according to some example embodiments. The systems and methods described herein utilize 2DFTs to represent audio (e.g., musical signals, such as cover songs or reference songs). One-dimensional (1D) Fourier transforms (1DFTs) have been used in music analysis, and 2DFTs have been used in digital image processing, such as for image de-noising and compression. Applying a 2DFT to an image converts pixel data of the image into sums of sinusoidal grids at different periods and orientations, represented by points in the 2DFT. On a spectrogram with a log-frequency scale, points along the y-axis of the 2DFT represent periodicities along the frequency domain of the spectrogram, and points along the x-axis represent periodicities along the time domain of the spectrogram. The information about the exact position of the sinusoidal grids in the original image is kept entirely in the phase.

A useful representation of musical audio is a CQT. The CQT is a transform with a logarithmic frequency resolution, with inter-frequency spacing that similar to the human auditory system and the Western musical scale. A linear shift in frequency in the CQT corresponds to a pitch shift in the music. By taking the magnitude of the 2DFT on the CQT of audio, the audio identification machine 110 can obtain a key-invariant representation of the audio. Thus, the audio may be represented and accordingly identified by a data structure that includes one or more 2DFTs performed on the CQT of the audio. In particular, according to the systems and methods discussed herein, such a data structure may be generated by taking the 2DFT of multiple time windows (e.g., overlapping, sliding, or both) of a CQT-based representation of the audio. Specifically, in some example embodiments, such a data structure is created by performing 2DFT on multiple overlapping time windows of a fingerprint of the CQT of the audio.

FIG. 4 illustrates three general operations that may be performed in accordance with the methods and systems discussed herein, according to various example embodiments. As a high-level overview, the audio identification machine 110 first performs a CQT of the audio to be represented by a data structure. This may be performed by calculating a CQT of each time slice among multiple time slices of the audio. The resulting aggregate CQT 410 is illustrated in the top image of FIG. 4. As shown in the top image, regions with brighter colors (e.g., region 411, which is light cyan colored) may indicate time-frequency bins with greater energies, while regions with darker colors (e.g., region 412 which is dark navy blue colored) may indicate time-frequency bins with lower energies.

Next, the audio identification machine 110 fingerprints the aggregate CQT 410 or otherwise obtains a fingerprint of the aggregate CQT 410. This may be performed using an adaptive thresholding algorithm and is illustrated by a fingerprint 420 (e.g., "live ID" fingerprint) in the middle image of FIG. 4.

Then, the audio identification machine 110 performs 2DFTs over sliding windows on the fingerprint 420 of the CQT 410, thus producing an ordered sequence 430 of 2DFTs (e.g., 2DFTs 431, 432, and 433) that represents the audio and may be used to identify the audio. The ordered sequence 430 of 2DFTs is shown in the bottom image of FIG. 4. Additional details are discussed presently.

In an example of the first operation, the entire time-domain audio signal (e.g., reference audio or query audio) is converted into a CQT, with frequencies corresponding to the musical scale between C3 (130.81 Hz) and C7 (2093 Hz), with a frequency resolution of 2 frequency bins per semitone, and with a time resolution of 10 frames per second. The use of the CQT enables a cover song in a different key to correspond to a linear shift in the CQT. For example, the CQT of the reference song "Can't Help Falling in Love" by Elvis Presley can be seen in the top image in FIG. 4.

In an example of the second operation, the CQT is binarized by the audio identification machine 110, and this binarization may be performed by applying an adaptive thresholding technique. For example, the audio identification machine 110 may identify time windows of uniform duration (e.g., a patch of a specified size, such as a group of time slices) within the CQT. Within each time window, values are binarized by setting them to 1 if they are above the median of the time window (e.g., the local median), and setting them to 0 otherwise. This may have the effect of scrubbing timbral information, as well as balancing the sound levels of different sources in the mixture. Thus, if a particular audio source (e.g., a distorted guitar) dominates the mixture in the original recording, but is not present in the cover rendition (e.g., an acoustic cover with no distorted guitar), the resulting binarized data (e.g., a fingerprint of the CQT) will be robust to these drastic changes in timbre and energy. Accordingly, such binarization may be considered as a pre-processing of the CQT to increase high-energy bins relative to low-energy bins, which may have the effect of accentuating the main patterns in the audio signal and thus improving results in identifying cover renditions of reference audio. An example of a binarized fingerprint of the CQT of "Can't Help Falling in Love" is shown in the middle image in FIG. 4.

In an example of the third operation, the audio identification machine 110 takes overlapping 20 second windows of the fingerprint and computes the 2DFT of each. For each 2DFT, the audio identification machine 110 calculates the magnitude of the 2DFT, discarding the phase, and adds a small amount of Gaussian blurring to increase robustness. The audio identification machine 110 then skips forward by 4 seconds, and computes another 2DFT. This process may be continued until the end of the fingerprint of the CQT has been reached. In this example, each 20 second window has a dimensionality of 96 by 200, and each 2DFT has the same dimensionality. The sequence of 2DFTs is a data structure that can be used as a representation of the audio (e.g., for cover song identification), as shown in FIG. 4. This representation is key-invariant due to the properties of the magnitude of the 2DFT. The values along the vertical axis of the 2DFT capture characteristic periodic patterns in frequency, and values along the horizontal axis capture characteristic periodic patterns in time, which may be useful patterns for cover song identification, since these patterns are likely to be retained between the cover rendition (e.g., cover song) and the reference audio (e.g., reference song).

Thus, the obtained data structure is a key-invariant (e.g., key-agnostic) representation of the audio. Moreover, the data structure retains structural information and scrubs loudness and timbral information. All of these aspects may change considerably between a cover song and its corresponding reference recording. Small tempo deviations between the cover and the reference can be addressed by application of blurring (e.g., Gaussian blurring) to each 2DFT, thus blurring the exact location of temporal periodicities in the audio. However, according to some example embodiments, large tempo deviations may be handled more directly. For example, the audio identification machine 110 may change the sampling rate on the reference recordings and repeat the fingerprinting procedure on the recordings with different sampling rates. Although this may have the effect of causing a pitch shift in the CQT, the key-invariance of the magnitude of the 2DFT causes this pitch shift to be irrelevant, unimportant, or otherwise minimized in effect. That is, the 2DFT is completely invariant to changing the sample rate at which the fingerprint (e.g., the binarized CQT) is generated. For each reference audio (e.g., reference recording), the audio identification machine 110 can fingerprint at a frequency between 0.5 and 2 times the original sample rate of 0.05 second intervals. These frequencies correspond to half speed and double speed, respectively. This example results in 30 2DFT sequences for each reference. According to some example embodiments, for each query audio (e.g., query recording, which may be a cover rendition), the audio identification machine 110 fingerprints at the original sample rate (e.g., exclusively)..

According to various example embodiments, the binarization technique used in the second operation may be particularly well-suited for generating CQT fingerprints that are robust to both audio degradations and audio variations, while still being compact enough for efficient computing. Such a fingerprint may be derived from a segment of an audio piece (e.g., a time slice of reference audio or a time slice of query audio) by first using a log-frequency spectrogram to capture the melodic similarity and handle key variations, and then using adaptive thresholding to reduce the feature size and handle noise degradations and local variations.

First, the segment is transformed into a time-frequency representation, such as a log-frequency spectrogram based on CQT. The CQT is a transform with a logarithmic frequency resolution, similar to the human auditory system and consistent with the notes of the Western music scale. Accordingly, the CQT may be well-suited for music analysis. The CQT may handle key variations relatively easily, since pitch deviations correspond to linear frequency translations in the transform. According to certain example embodiments, the CQT is computed by using a fast algorithm based on the Fast Fourier Transform (FFT) in conjunction with the use of a kernel. Thus, a CQT-based spectrogram of the audio (e.g., reference audio or query audio) may be derived by using a time resolution of around 0.13 seconds per time frame and the frequency resolution up one quarter note per frequency channel, with a frequency range spanning from C3 (130.81 Hz) to C8 (4186.01 Hz), resulting in 120 frequency channels.

Next, the CQT-based spectrogram may be binarized (e.g., transformed into a binary array, much like a binary image). According to various example embodiments, this is performed using an adaptive thresholding algorithm that is based on two-dimensional median filtering. Thresholding can perform image segmentation by using a threshold value to turn a grayscale image into a binary image. In adaptive thresholding, the threshold value for each pixel of an image may be adapted based on local statistics of the pixel's neighborhood. According to various example embodiments, for each time-frequency bin (e.g., for each time slice) in the CQT-based spectrogram, given a window size (e.g., a range duration), the median of the neighborhood (e.g., a range of time slices) may be computed. As an example, the window size may be 35 frequency channels by 15 time frames. Then, the value of the bin may be compared with the value of its median. If the value of the bin is higher than its median, the value of the bin may be assigned to 1. If otherwise, the value of the bin may be assigned to 0. This process may be stated as the following equation:

$$\forall (i, j), M(i, j) = \underset{\substack{i-\Delta_i \leq I \leq i+\Delta \\ j-\Delta_j \leq J \leq j+\Delta_j}}{\text{median}} X(I, J)$$

$$\forall (i, j), B(i, j) = \begin{cases} 1 & \text{if } X(i, j) > M(i, j) \\ 0 & \text{otherwise} \end{cases}$$

Accordingly, the CQT-based spectrogram may be clustered into foreground (e.g., with assigned values of one) where the energy is locally high, or background (e.g., with assigned values of zero) with the energy is locally low. The result may therefore be used as a compact fingerprint (e.g., a CQT-based fingerprint) that can handle noise degradations while still allowing local variations.

Figure 5:
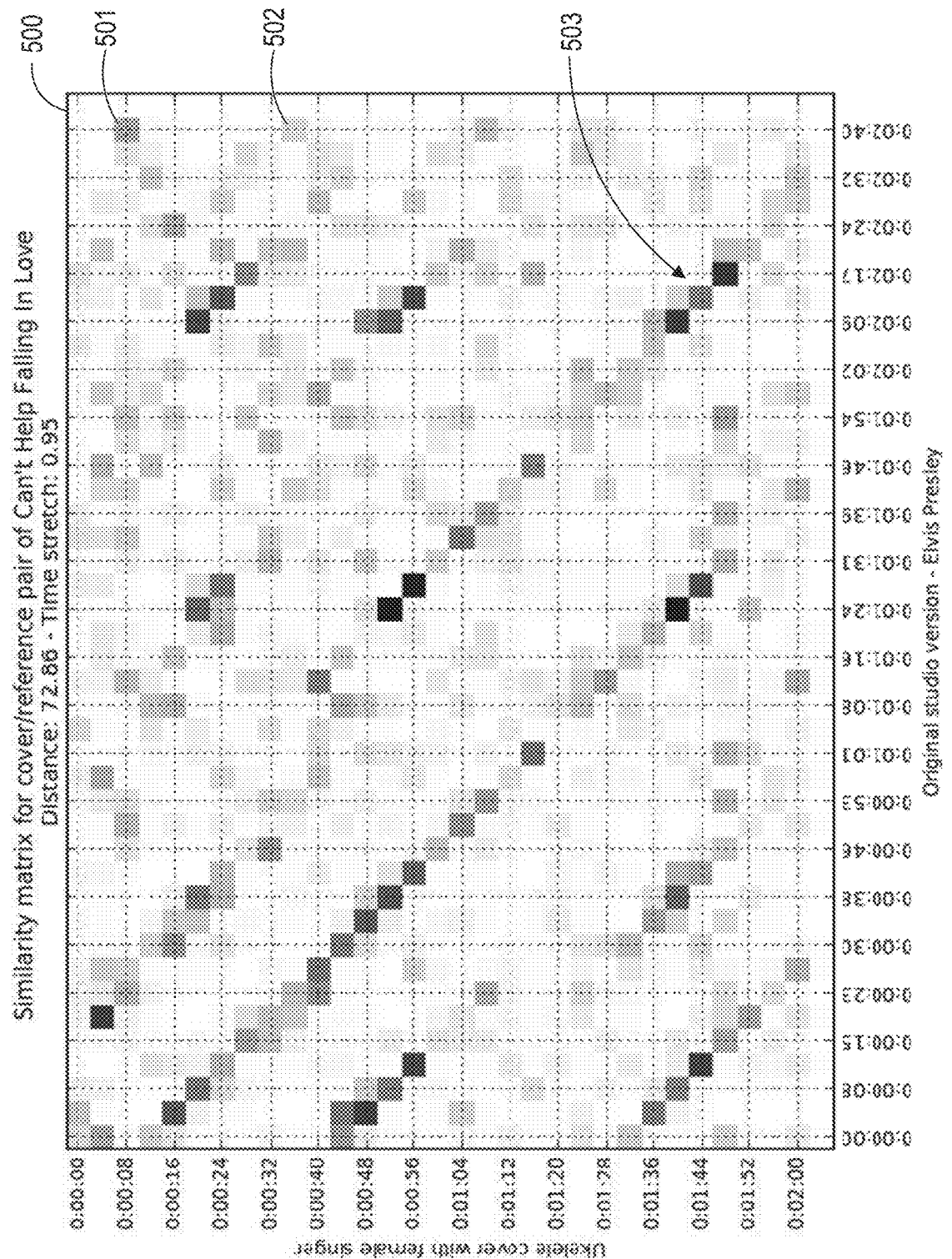
FIG. 5 is a conceptual diagram illustrating a similarity matrix that indicates similarities between a cover song and a reference song at various time points, according to some example embodiments.

FIG. 5 is a conceptual diagram illustrating a similarity matrix 500 that indicates similarities between query audio (e.g., a cover song) and reference audio (e.g., a reference song) at various time points, according to some example embodiments. In the example shown, the similarity matrix 500 is constructed using pairwise Euclidean distances between 2DFT sequences on a ukulele cover of "Can't Help Falling in Love" and the original studio version of the song, both from the "YouTube Covers" dataset.

In cover song identification, the audio identification machine 110 may be provided with a query song for comparison against a database (e.g., database 115) of reference songs using a distance measure. The reference songs may then be ranked in ascending distance by the audio identification machine 110. A good distance measure will have the correct reference song highly ranked for a given query song. According to certain example embodiments, the audio identification machine 110 computes this distance measure from a cross-similarity matrix (e.g., similar to the similarity matrix 500 shown in FIG. 5) between the query song and a candidate reference song. The query song and the reference song may be represented as a sequence of 2DFTs. For example, the audio identification machine 110 may compute the distance measured by a computing the Euclidean distance between every pair of 2DFTs and storing them in the similarity matrix 500. In alternative example embodiments, cosine similarity may be used instead of Euclidean distance. In addition, the audio identification machine 110 may normalize the similarity matrix 500 by its maximum value. Furthermore, the audio identification machine 110 may save the energy E of the non-normalized similarity matrix 500.

Next, the audio identification machine 110 may postprocess the similarity matrix 500 by convolving it with a checkerboard kernel:

$$\begin{bmatrix} 1 & -1 \\ -1 & 1 \end{bmatrix}$$

Positive elements in the convolved SM correspond to diagonal matches and negative elements correspond to non-diagonal matches. The audio identification machine 110 may then set all negative elements to 0, resulting in a similarity matrix with just the diagonals, like the similarity matrix 500 shown in FIG. 5. The checkerboard kernel preserves sequential matches in the convolved similarity matrix (e.g., similarity matrix 500), and removes spurious matches between single 2DFT patches between the cover audio and the reference audio.

In the example shown in FIG. 5, a diagonal of length 2 in the processed (e.g., convolved) similarity matrix 500 corresponds to a 24 second match between the query and the reference. FIG. 5 also illustrates different elements being shaded differently, such that darker shadings represent stronger similarity (e.g., greater degrees or extent of similarity). For example, element 501 (e.g., a positive element that was not set to zero) is shaded medium gray to represent moderate similarity, while element 502 (e.g., another positive element that was not set to zero) is shaded light gray to represent mild similarity. Diagonals of strong similarity are indicated by diagonal chains of elements whose colors are relatively dark (e.g., darker than the mean shade of all elements, or darker than 50% grayscale). For example, the diagonal 503 is a diagonal of length 3 in the similarity matrix 500, and represented by three diagonally contiguous elements that are shaded at 50% grayscale or darker.

To compute the distance between a query and reference, the audio identification machine 110 identifies (e.g., extracts or otherwise obtains) a set of one or more diagonals from the similarity matrix 500, and calculates and records their sum and length. This may be performed by iterating through each diagonal in the similarity matrix 500 and segmenting it into non-zero sequences. These non-zero sequences indicate matches beginning and ending at various offsets in the cover and the reference. For each sequence, the audio identification machine 110 calculates and records the sum of everything in the sequence w, as well as the length of the sequence l. The corresponding diagonal is scored using the product of these two: wl. In certain example embodiments, the audio identification machine 110 then ranks (e.g., sorts) all of the diagonals in the similarity matrix 500 (e.g., by decreasing score), identifies the top three diagonals and calculates the sum of the scores for the most dominant diagonals (e.g., the top three diagonals). Next, the audio identification machine 110 divides the energy, E, of the non-normalized similarity matrix 500 by the sum of the scores for the most dominant diagonals (e.g., the top three diagonals) to calculate a distance measure, as follows:

$$d(q, r) = \frac{E}{\sum_{i=1}^{3} w_i l_i}$$

where i is the index of the sorted diagonals list, q is the query audio, and r is the reference audio. The number of diagonals to sum may be a free parameter. According to certain example embodiments, the constant three (3) is used to limit the most dominant diagonals, while other example embodiments use a different constant (e.g., 2, 4, 5, or 10) to define the subset of most dominant diagonals.

This approach focuses on sequential matches happening somewhere in the similarity matrix 500, and not where they are. As a result, the calculated distance measure is invariant to structural changes (e.g., a skipped bridge or verse, or an added intro and outro). However, if the audio identification machine 110 detects that the tempo of the cover song is significantly different (e.g., beyond a threshold tempo difference) than the tempo of the original reference song, the audio identification machine 110 may avoid or otherwise minimize failures in subsequence alignment by computing the similarity matrix 500 across all of the available resampled versions of the reference audio. For example, the distance measure between a query q and reference r may then be given by:

$$\text{distance}(q,r) = \min_{x \in \{0.5,\ 0.55,\ \ldots,\ 2\}} d(q, r_x)$$

where $r_x$ indicates the reference audio with a resampling factor of x.

The similarity matrix for a cover song and its corresponding (e.g., correct) reference song may be similar to the example similarity matrix 500 shown in FIG. 5. As depicted in FIG. 5, in the example cover song, the verse starts at 16 seconds, and in the example reference, the verse starts at 8 seconds. In the similarity matrix 500, a clear diagonal can be seen indicating sequential matches. In the cover, the singer also adds a longer intro section than in the original song. In addition, the instrumentation has changed considerably. The original song has drums, guitar, piano, backing singers, and a male lead singer. The example cover song has just a ukulele playing the chords, and a female singer on the melody, which is now an octave higher than the original, and is slightly slower. There are also structural differences between the example cover song and the example reference song. The best alignment between cover and reference was found at a resampling factor of 0.95. The similarity matrix in FIG. 5 shows that the data structure described herein for representing audio and the distance measure described herein are robust to these differences between the example cover song and the example reference song.

An example embodiment of the audio identification machine 110 has been tested on the "YouTube Covers" dataset that contains 50 compositions, with seven recordings of each. In each set of seven recordings, one is the original studio version; one is a live version performed by the original artist; and five are cover versions. The reference set contains the original studio versions and the live versions for each composition. The query set contains the five covers versions for each composition. In all, the size of the reference set is 100, and the size of the query set is 250. In experiments on this example embodiment of the audio identification machine 110, each query was compared to every reference, thus calculating a distance measure for each query-reference pair. The example embodiment of the audio identification machine 110 then ranked the references for each query and computed the mean average precision, the precision at 10, and the mean rank of the first correctly identified cover.

In addition, an example embodiment of the audio identification machine 110 has been tested using the "covers80" dataset. This dataset contains 80 compositions, with two recordings of each, one being a cover, and the other being a reference (e.g., an original version). When tested with the "YouTube Covers" dataset, this example embodiment of the audio identification machine 110 surpassed current state-of-the-art methods in mean average precision and in precision at 10. For example, the example embodiment of the audio identification machine 110 correctly found 164 covers out of 250 at top one. The impact of the adaptive thresholding operation was remarkable, causing a jump in mean average precision of 0.127, and taking precision at 10 from the worst performing approach to the best performing approach. The adaptive thresholding operation may have the effect of emphasizing structure over timbre and energy, leading to more salient similarity measures.

Figure 6:
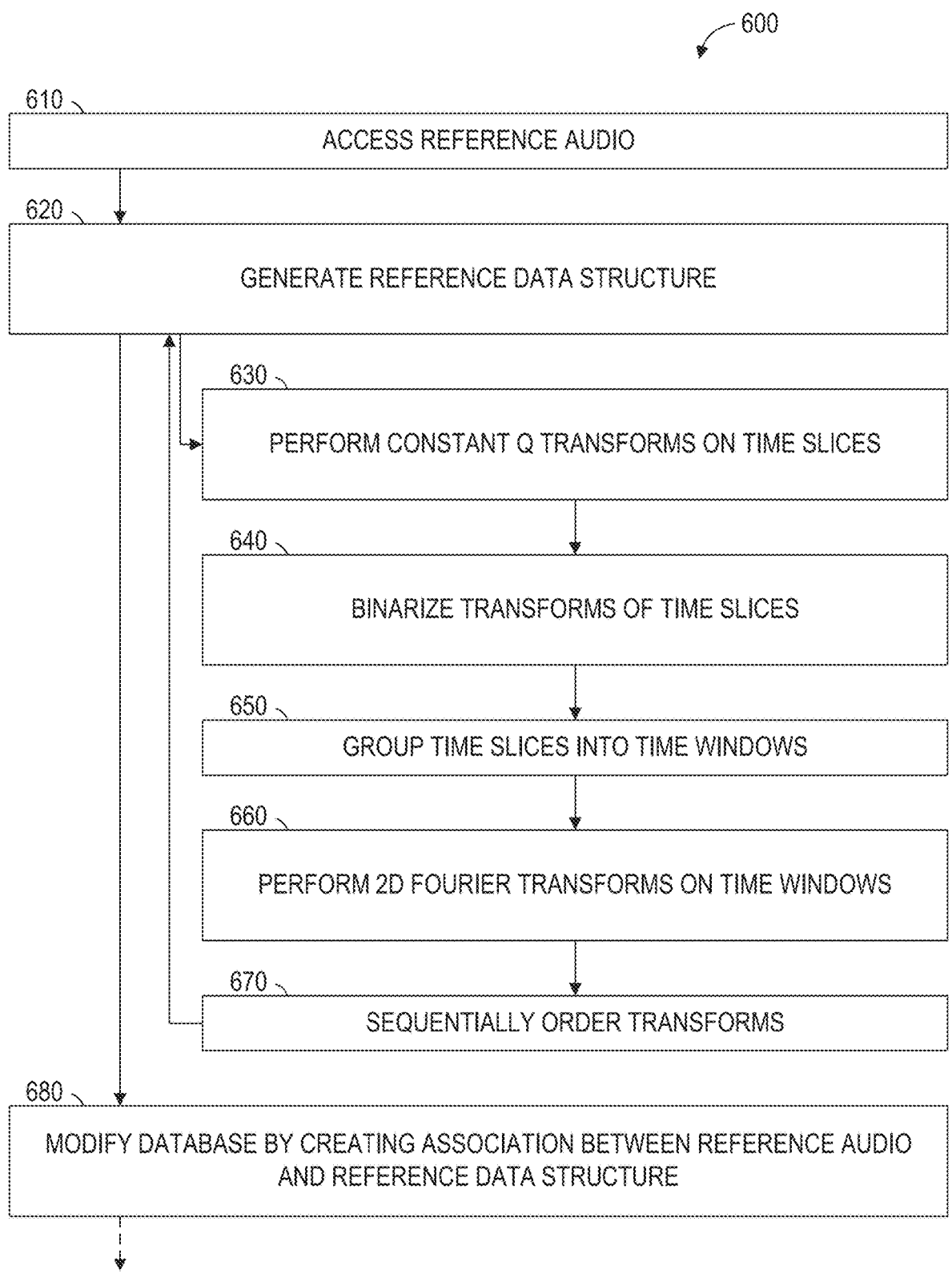
FIGS. 6-9 are flowcharts illustrating operations in a method of audio identification based on a data structure, according to some example embodiments.

FIGS. 6-9 are flowcharts illustrating operations in a method 600 of audio identification based on a data structure, according to some example embodiments. As shown in FIG. 6, according to a first example embodiment, the method 600 includes operations 610, 620, and 680. In operation 610, the audio accessor 210 accesses reference audio to be represented by a reference data structure.

In operation 620, all or part of the application 200 or the app 300 generates the reference data structure from the reference audio. This may be performed in accordance with one or more of operations 630, 640, 650, 660, and 670, any one or more of which may be performed as part (e.g., a precursor task, a subroutine, or a portion) of operation 620.

In operation 630, the first-stage transformer 220 performs a CQTon each of multiple reference time slices of the reference audio.

In operation 640, the binarizer 230 binarizes the constant Q transformed reference time slices of the reference audio. This may be performed by, for each reference time slice, calculating a median value of a range of reference time slices that encompasses the reference time slice and binarizing the reference time slice based on the calculated median value of the range.

In operation 660, the second-stage transformer 240 performs a 2DFT on each of multiple reference time windows within the binarized and constant Q transformed reference time slices of the reference audio to obtain 2DFTs of the reference time windows.

In operation 670, the second-stage transformer 240 sequentially orders the 2DFTs of the reference time windows in the reference data structure. This may complete the generation of the reference data structure.

In operation 680, the database and device controller 250 controls a reference database (e.g., database 115) by creating, within the reference database, a data association (e.g., a first data association) between the reference audio and the generated reference data structure that includes the sequentially ordered 2DFTs of the reference time windows. In some example embodiments, the created data association indicates that the reference data structure is an identifier of the reference audio.

As shown in FIG. 6, according to a second example embodiment, the method includes operation 650. In operation 650, the second-stage transformer 240 groups the binarized and constant Q transformed reference time slices of the reference audio into the multiple reference time windows. In the example shown in FIG. 6, this is being performed prior to the performing of the 2DFT on each of the multiple reference time windows. In some example embodiments, the multiple reference time windows include (e.g., exclusively) overlapping reference time windows of uniform duration (e.g., 10 seconds, 15 seconds, 20 seconds, 25 seconds, or 30 seconds).

Furthermore, according to a third example embodiment of the method 600, the generating of the reference data structure in operation 620 includes applying a blur algorithm to each of the 2DFTs of the reference time windows prior to the sequential ordering of the 2DFTs in the reference data structure.

Figure 7:
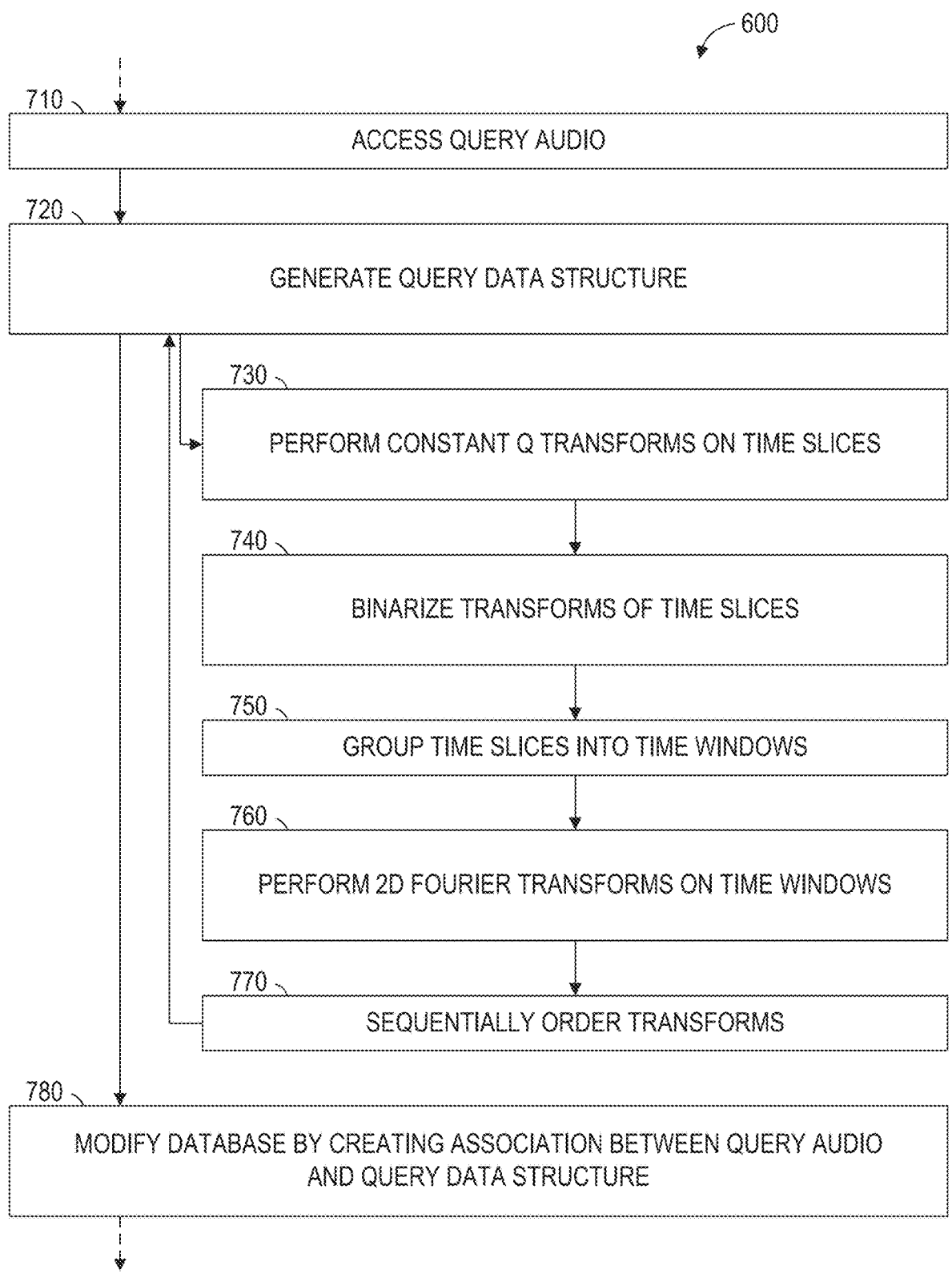

As shown in FIG. 7, according to a fourth example embodiment, the method 600 include one or more of operations 710, 720, and 780. In operation 710, the audio accessor 210 accesses query audio to be represented by a query data structure for comparison to the reference data structure that represents the reference audio.

In operation 720, all or part of the application 200 or the app 300 generates the query data structure from the query audio. This may be performed in accordance with one or more of operations 730, 740, 750, 760, or 770, any one or more of which may be performed as part of operation 720.

In operation 730, the first-stage transformer 220 performs a CQT on each of multiple query time slices of the query audio.

In operation 740, the binarizer 230 binarizes the constant Q transformed query time slices of the query audio. This may be performed by, for each query time slice, calculating a median value of a range of query time slices that encompasses the query time slice and binarizing the query time slice based on the calculated median value of the range.

In operation 760, the second-stage transformer 240 performs a 2DFT on each of multiple query time windows within the binarized and constant Q transformed query time slices of the query audio to obtain 2DFTs of the query time windows.

In operation 770, the second-stage transformer 240 sequentially orders the 2DFTs of the query time windows in the query data structure.

As shown in FIG. 7, according to a fifth example embodiment, the method 600 includes operations 750. In operation 750, the second-stage transformer 240 groups the binarized and constant Q transformed query time slices of the query audio into the multiple query time windows. In the example shown in FIG. 7, this is being performed prior to the performing of the 2DFT on each of the multiple query time windows, the query time windows including overlapping query time windows of uniform duration (e.g., 10 seconds, 15 seconds, 20 seconds, 25 seconds, or 30 seconds).

Figure 8:
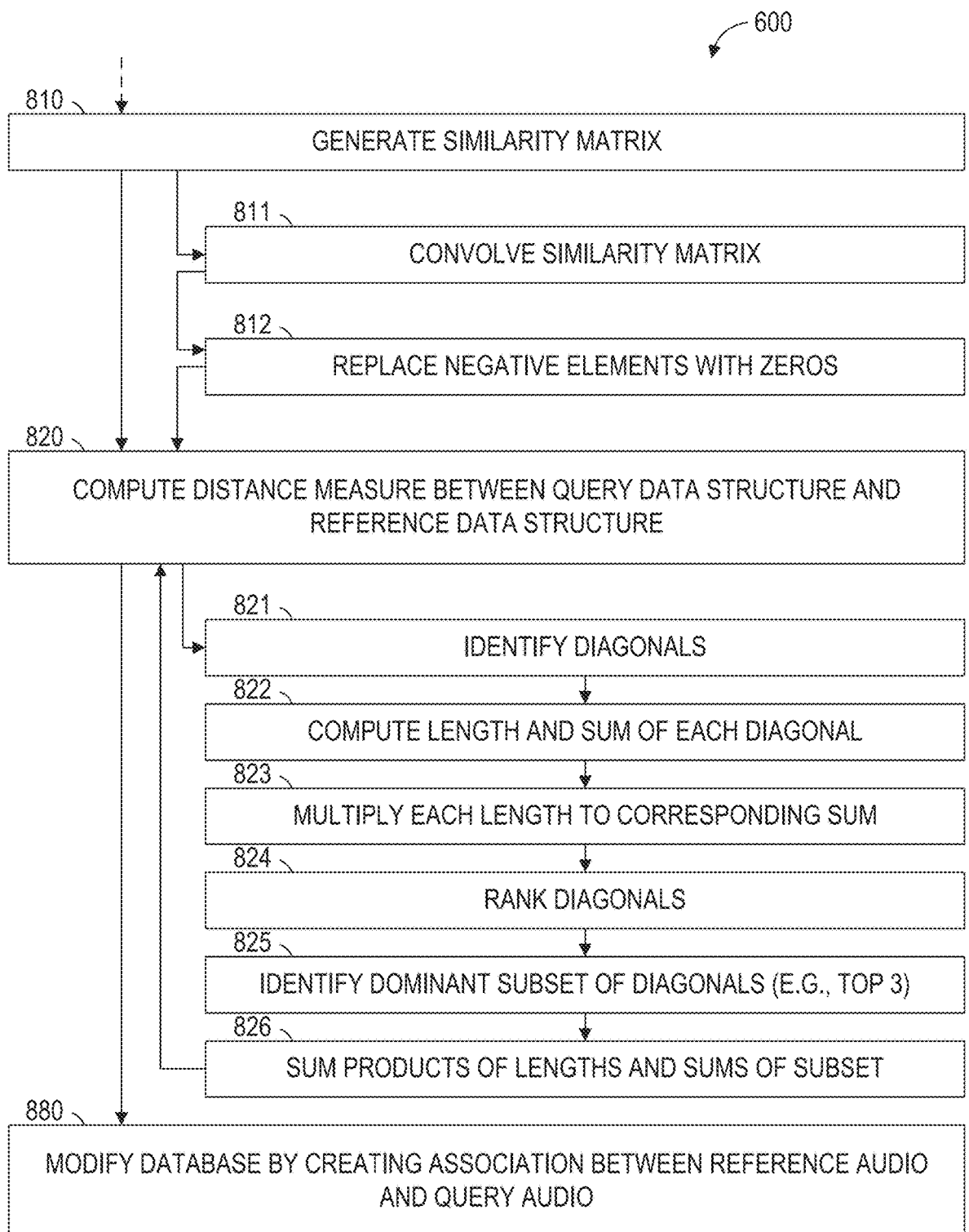

As shown in FIG. 8, according to a sixth example embodiment, the method 600 includes one or more of operations 810, 820, and 880. In operation 810, the second-stage transformer 240 generates a similarity matrix (e.g., similar to the similarity matrix 500 shown in FIG. 5) that indicates degrees to which reference portions of the reference data structure are similar to query portions of the query data structure.

In operation 820, the second-stage transformer 240 computes a distance measure between the query data structure and the reference data structure based on the generated similarity matrix. This may be performed in accordance with all or part of the above description regarding FIG. 5.

In operation 880, the database and device controller 250 controls the reference database (e.g., database 115) by creating, within the reference database, a further data association (e.g., a second data association) between the reference audio and the query audio based on the computed distance measure between the query data structure and the reference data structure. In some example embodiments, the created further data association indicates that the query audio is a cover rendition of the reference audio.

As shown in FIG. 8, according to a seventh example embodiment, the method 600 includes one or more of operations 811 and 812. In operation 811, the second-stage transformer 240 convolves the generated similarity matrix with a checkerboard kernel. This may be performed as described above with respect to FIG. 5. In some example embodiments, the convolved similarity matrix includes positive elements and negative elements.

In operation 812, the second-stage transformer 240 replaces the negative elements of the convolved similarity matrix with zeros. In such example embodiments, the computing of the distance measure between the query data structure and the reference data structure (e.g., in operation 820) may be based on the convolved similarly matrix with the negative elements replaced with zeros.

As shown in FIG. 8, according to an eighth example embodiment, the method 600 includes one or more of operations 821, 822, 823, 824, 825, and 826, any one or more of which may be performed as part of operation 820 and in accordance with all or part of the above description regarding FIG. 5. In operation 821, the second-stage transformer 240 identifies diagonals in the convolved similarity matrix with the negative elements replaced with zeros.

In operation 822, the second-stage transformer 240 computes lengths and sums of the diagonals in the convolved similarity matrix.

In operation 823, the second-stage transformer 240 computes multiplicative products of the lengths and the sums of the diagonals in the convolved similarity matrix.

In operation 824, the second-stage transformer 240 ranks the diagonals based on the multiplicative products of the length and the sums of the diagonals in the convolved similarity matrix.

In operation 825, the second-stage transformer 240 identifies a dominant subset of the diagonals based on the ranking of the diagonals in the convolved similarity matrix.

In operation 826, the second-stage transformer 240 sums multiplicative products of lengths and sums of the dominant subset of the ranked diagonals in the convolved similarity matrix. In such example embodiments, the computing of the distance measure between the query data structured and the reference data structure may be based on the summed multiplicative products of lengths and sums of the dominant subset of the ranked diagonals in the convolved similarity matrix.

Figure 9:
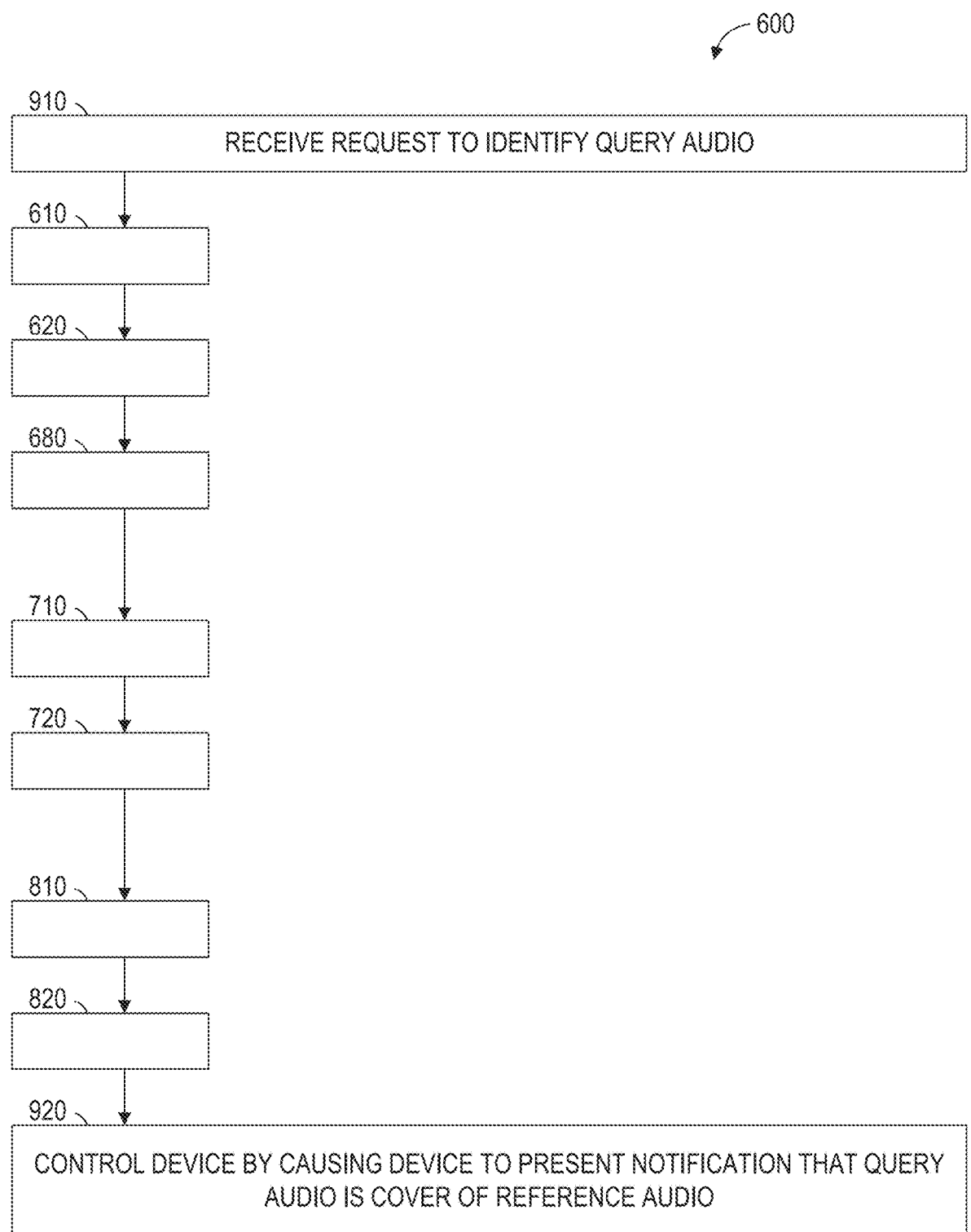

As shown in FIG. 9, according to a ninth example embodiment, the method 600 includes one or more of operations 910 and 920. In operation 910, the audio accessor 210 receives (e.g., via the network 190) a request to identify the query audio, the request being received from a device (e.g., device 130 or 150).

In operation 920, the database and device controller 250 controlling the device from which the request was received (e.g., device 130 or 150) by causing the device to present a notification that the query audio is a cover rendition of the reference audio. This may be performed based on the computed distance measure between the query data structure and the reference data structure.

Thus, according to various example embodiments, one or more of the methodologies described herein may facilitate identification of an audio piece. Moreover, one or more of the methodologies described herein may facilitate identification of a cover rendition of audio piece, even where the cover version differs from a reference rendition of the audio piece. Hence, one or more the methodologies described herein may facilitate retrieval and presentation of information regarding the identified audio piece (e.g., its identifier and some or all of its metadata). Furthermore, one or more of the methodologies described herein may facilitate identification and tagging of cover songs that contain significant musical differences from their corresponding original reference songs.

When these effects are considered in aggregate, one or more of the methodologies described herein may obviate a need for certain efforts or resources that otherwise would be involved in identifying an audio piece. Efforts expended by a user may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

B. Copyright Management Using Automated Cover Song Identification

Automated cover song identification can provide various benefits as part of a copyright management system. With the proliferation of online music and video sharing sites, tracking and managing the licensing of protected works manually is extremely difficult. Online content repositories may provide access to several million files and thousands of hours of audio content, some of which can include unlicensed cover songs. In cover song identification, a typical task is to recognize a recorded song performed by a performer who is not the original artist and posted or uploaded to an online content repository. In the cover, there may be key variation, slight tempo variation, musical structure changes (e.g., for an artist that is known to improvise), or any suitable combination thereof. The audio signal may also be degraded (e.g., due a non-professional quality microphone or webcam). A rights holder may have to first discover where the audio content is located in an online content repository as well as determine whether the audio content is a cover song of a protected work.

According to the systems and methods described herein, audio may be represented using a sequence of two-dimensional (2D) Fourier transforms (2DFTs), and such a sequence may be used by a specially configured machine to perform audio identification (e.g., cover song identification). Such systems and methods are robust to timbral changes (e.g., instrumentation changes), time skews (e.g., small local tempo deviations), and pitch skews (e.g., key changes). In particular, a special data structure provides a time-series representation of audio, and this time-series representation is robust to key changes, timbral changes, and small local tempo deviations.

According to the systems and methods described herein, automated cover song identification can be incorporated into a copyright management system, a digital rights management system, or other licensing management system. Such systems and methods receive metadata about artists, songs, lyrics, publishers, and the like, associated with one or more protected works. The systems and methods can use the metadata (e.g., retrieved from a rights database) to search one or more content repositories (e.g., online or offline). The systems and method can also use the metadata to partition a search space improving identification performance. The systems and methods can identify audio content (e.g., music files, video files, etc.) retrieved from a content repository that potentially includes a cover of a protected work. The systems and methods can detect whether the audio content is a cover of the protected work even when the audio content is not the exact as one or more expressions of the protected work. Such systems and methods are robust to timbral changes (e.g., instrumentation changes), time skews (e.g., small local tempo deviations), and pitch skews (e.g., key changes) in the audio stored in the content repository.

In particular, the systems and methods provide a special data structure having a time-series representation of audio associated with a protected work, and this time-series representation is robust to key changes, timbral changes, and small local tempo deviations that can occur in audio content retrieved from the online content repository that includes a cover of the protected work. Accordingly, the systems and methods described herein generate a candidate list of potential cover songs found within one or more content repositories. A right holder or designated representative can then more easily review the candidate list of potential cover songs without having to search each repository manually.

Figure 10:
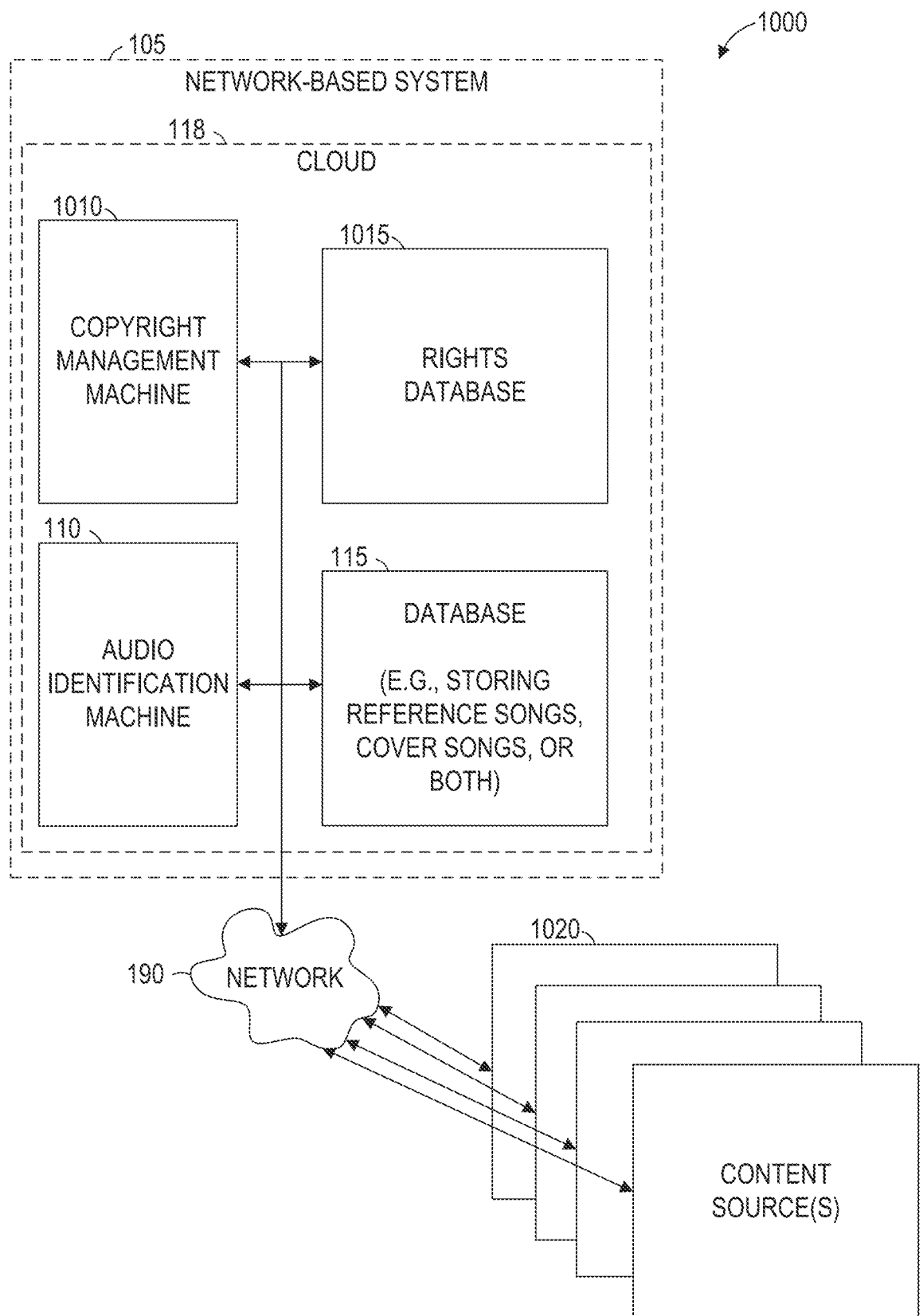
FIG. 10 is a network diagram illustrating a network environment suitable for automated cover song identification, according to some example embodiments.

FIG. 10 is a network diagram illustrating a network environment 1000 suitable for automated cover song identification, according to some example embodiments. The network environment 1000 includes an audio identification machine 110, a database 115, a copyright management machine 1010, a rights database 1015, and one or more content sources 1020, all communicatively coupled to each other via a network 190. The audio identification machine 110, the database 115, the copyright management machine 1010, and the rights database 1015 may form all or part of a cloud 118 (e.g., a geographically distributed set of multiple machines configured to function as a single server), which may form all or part of a network-based system 105 (e.g., a cloud-based server system configured to provide one or more network-based services). The audio identification machine 110 and the copyright management machine 1010 may each be implemented in a special-purpose (e.g., specialized) computer system, in whole or in part, as described below with respect to FIG. 13.

As shown, the database 115 may store reference audio (e.g., reference songs), query audio (e.g., cover songs), various metadata (e.g., identifiers) thereof, or any suitable combination thereof. The rights database 1015 may store information associated with audio content. A user, such as a right holder may register audio content in the rights database 1015, e.g., via copyright management machine 1010. The user may describe the audio content by title, artist, publisher, and other identifying indicia. The user may provide various keywords, attributes, tags, etc. associated with the audio content. The user may provide additional metadata associated with the audio content, such as right holder information, royalty information, license information, and the like. The user may be a human user (e.g., a human being), a machine user (e.g., a computer configured by a software program), or any suitable combination thereof (e.g., a human assisted by a machine or a machine supervised by a human).

In addition, FIG. 10 illustrates the one or more content source(s) 1020. In some situations, the content sources 1020 are online content repositories that provide access to an audio piece (e.g., a stream of a live broadcast, a video sharing site, etc.). In other situations, the content sources 1020 are social networks providing social networking feeds, posts, updates, tweets, etc. that include an audio piece. The audio piece may include a cover rendition of a song that was written and recorded by a right holder that registered the song with copyright management machine 1010.

Any of the systems or machines (e.g., databases and devices) shown in FIG. 10 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 13, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

The network 190 may be any network that enables communication between or among systems, machines, databases, and devices (e.g., between the audio identification machine 110, the copyright management machine 1010, and the content sources 1020). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 11:
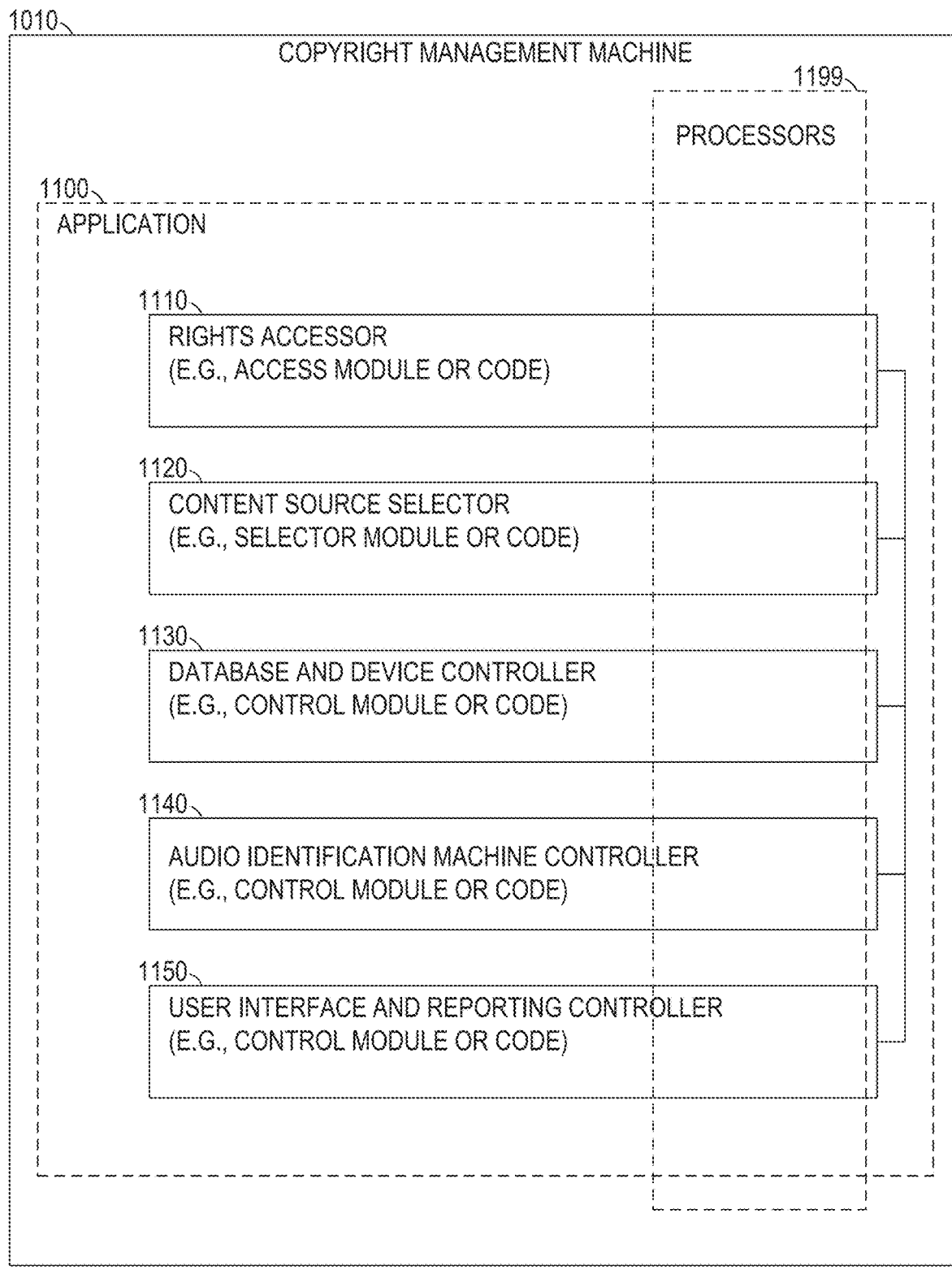
FIG. 11 is a block diagram illustrating components of copyright management machine suitable for automated cover song identification, according to some example embodiments.

FIG. 11 is a block diagram illustrating components of the copyright management machine 1010, according to some example embodiments. The copyright management machine 1010 is shown as including a rights accessor 1110 (e.g., an access module or other accessing code), a content sources selector 1120 (e.g., a selector module or other selecting code), a database and device controller 1130 (e.g., a control module or other controller code), an audio identification machine controller 1140 (e.g., a control module or other controller code), and a user interface and reporting controller 1150 (e.g., a control module or other controller code), all configured to communicate with each other (e.g., via a bus, shared memory, or a switch).

As shown in FIG. 11, the rights accessor 1110, the content sources selector 1120, the database and device controller 1130, the audio identification machine controller 1140, and the user interface and reporting controller 1150 may form all or part of an application 1100 (e.g., a server application) that is stored (e.g., installed) on the copyright management machine 1010. Furthermore, one or more processors 1199 (e.g., hardware processors, digital processors, or any suitable combination thereof) may be included (e.g., temporarily or permanently) in the application 1100, the rights accessor 1110, the content sources selector 1120, the database and device controller 1130, the audio identification machine controller 1140, and the user interface and reporting controller 1150, or any suitable combination thereof.

Any one or more of the components (e.g., modules) described herein may be implemented using hardware alone (e.g., one or more of the processors 1199) or a combination of hardware and software. For example, any component described herein may physically include an arrangement of one or more of the processors 1199 (e.g., a subset of or among the processors 1199) configured to perform the operations described herein for that component. As another example, any component described herein may include software, hardware, or both, that configure an arrangement of one or more of the processors 1199 to perform the operations described herein for that component. Accordingly, different components described herein may include and configure different arrangements of the processors 1199 at different points in time or a single arrangement of the processors 1199 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

In general, the rights accessor 1110 includes hardware and/or software elements configured to access rights metadata associated with audio content in rights database 1015. The rights accessor 1110 may be utilized in conjunction with a user interface that enables a user (e.g., a right holder) to register audio content with rights database 1015. The user may upload one or more audio pieces to the copyright management machine 1010 and provide metadata identifying and describing the audio pieces. The rights accessor 1110 may store the audio pieces and the metadata in database 115, rights database 1015, or combinations thereof.

The rights accessor 1110 may retrieve rights metadata from rights database 1015 initiating a search for potentially unlicensed cover songs. The rights accessor 1110 may initiate a search in response to one or more time-based events, user-define or machine-led triggers, or the like. The rights accessor 1110 may forward the rights metadata to one or more components for further processing with or configuration of the components.

In general, the content sources selector 1120 includes hardware and/or software elements configured to select one or more content sources for automatic cover song identification. The content sources selector 1120 may include one or more plugins (not shown) that describe a content source and one or more means for accessing data and metadata via the content source. The content sources selector 1120 may select a set of content sources based on information provided by a right holder, the rights metadata, popularity of the content sources, likelihood of the content sources having potentially unlicensed cover songs, or the like.

In some embodiments, the content sources selector 1120 accesses a content source, determines a candidate list of audio content, and retrieves the audio content from the content sources for automated cover song identification. The content sources selector 1120 may access a selected content sources utilizing one or more search interfaces, application programming interfaces (APIs), commands, instructions, calls, or the like. In one aspect, the content sources selector 1120 may query a selected content source for one or more candidates having a title that matches or otherwise includes one or more keywords in rights metadata obtained from rights database 1015. In another aspect, the content sources selector 1120 may query a selected content source for one or more candidates having descriptions, user comments, annotations, reviews, or other supplemental data that matches or otherwise includes one or more keywords in rights metadata obtained from rights database 1015. For example, an audio piece posted to a video sharing site may not explicitly identify the title of a registered audio piece in the post nor provide any attribution in an associated description. However, a subsequent comment to the post may include a mention of the title of the registered audio piece. In another aspect, the content sources selector 1120 may actively monitor one or more data feeds, social networks, live streams, etc. for mentions of registered content.

The content sources selector 1120 may determine a candidate list of audio content in response to accessing the content source. The content sources selector 1120 may retrieve search results that identify or are otherwise indicative of a cover song of a protected work. The content sources selector 1120 may retrieve the audio content (or a suitable identifier or resource locator) and initiate automated cover song identification using the audio identification machine 110.

The database and device controller 1130 include hardware and/or software elements configured to access and control one or more database and/or devices. The database and device controller 1130 may be embodied similar to that of the database and device controller 250 of FIG. 2.

The audio identification machine controller 1140 includes hardware and/or software elements configured to control the audio identification machine 110. As discussed above, the audio identification machine 110 provide cover song identification that is robust to key changes, timbral changes, and small local tempo deviations that occur in audio content stored in the select content source. Thus, audio identification machine 110 can extract features (e.g., sequences of 2DFTs) from audio fingerprints and calculate a distance measure between audio fingerprints in a manner that is robust and invariant to changes in musical structure allowing rights holders to identify cover songs found within the selected content source that may or may not be licensed.

The user interface and reporting controller 1150 includes hardware and/or software elements that generate user interfaces and reports. The user interface and reporting controller 1150 may generate one or more user interfaces having elements that enable a user to register a protected work. The user interface and reporting controller 1150 may provide wizards that guide the user through the processor of describing the work, e.g., by title, author, publisher, etc. The user interface and reporting controller 1150 may also generate one or more user interfaces that enable the user to review a list of registered works associated with the use. The user interface and reporting controller 1150 may interact with a listing to view information about a registered work and a candidate list of potential cover songs identified by the audio identification machine 110. The candidate list can include the audio piece, information about the audio piece, information obtained from the content source where the audio piece was found, or the like.

The user interface and reporting controller 1150 may generate one or more reports that notify a user about potential candidates for cover songs of a protected work. The user interface and reporting controller 1150 may generate one or more notification that identify a potential candidate, the content source at which the candidate may be found, a user associated with the candidate, or the like. The user interface and reporting controller 1150 may generate notification that allow a user to process a verification workflow enabling a right holder or representative to verify whether a cover song has been identified and whether the cover song is unlicensed. The user may be able to send one or more messages to the content source and/or the user that uploaded the cover song as part of the workflow.

Figure 12:
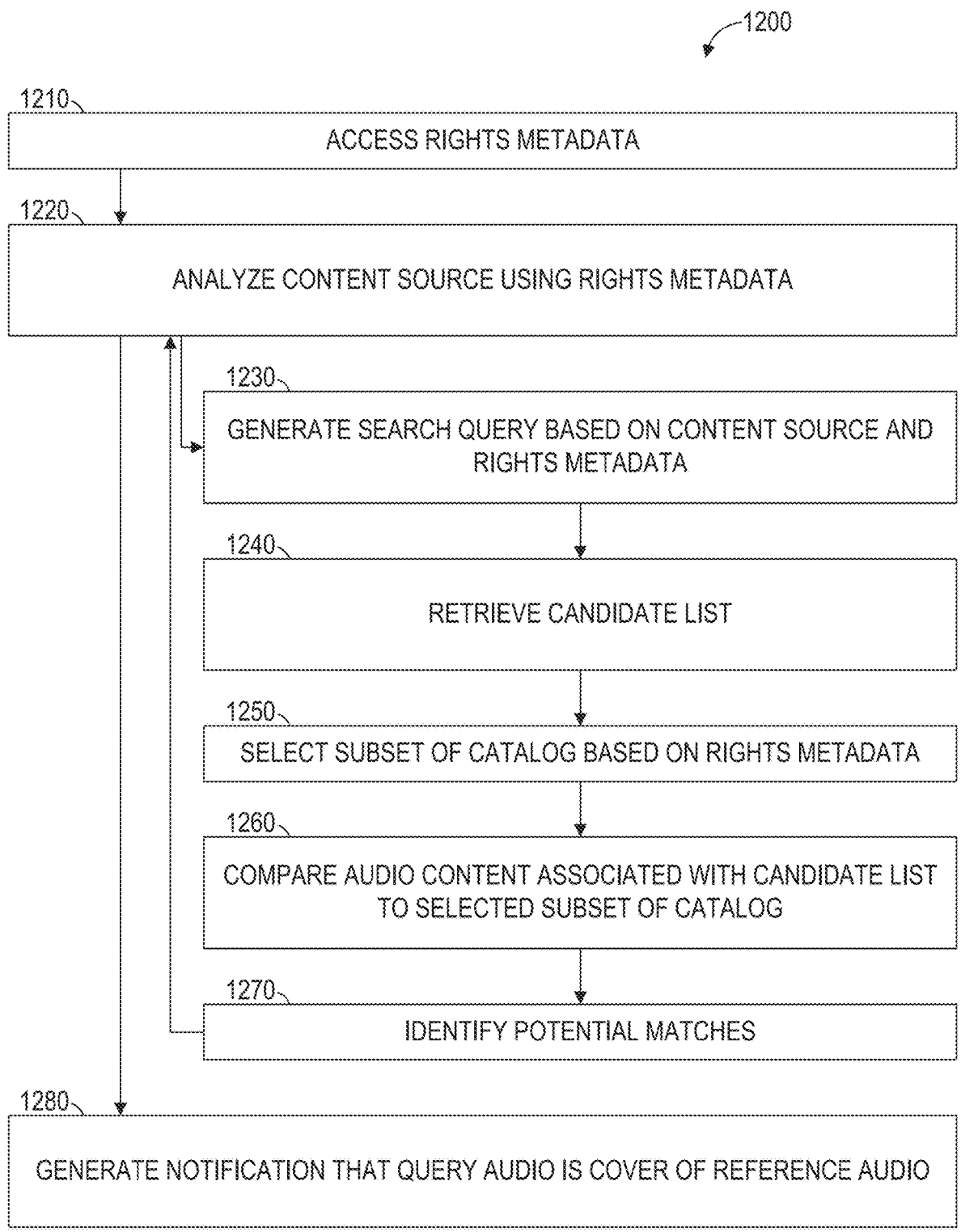
FIG. 12 is a flowchart illustrating operations in a method of automated cover song identification, according to some example embodiments.

FIG. 12 is a flowchart illustrating operations in a method of automated cover song identification, according to some example embodiments. As shown in FIG. 12, according to a first example embodiment, the method 1200 includes operations 1210, 1220, and 1280. In operation 1210, the rights accessor 1110 accesses rights metadata. The rights accessor 1110 may retrieve the rights metadata from rights database 1015. The retrieved rights metadata can include information that identifies one or more protected works (e.g., by title or artist).

In operation 1220, the content source selector 1120 analyses a content source using the rights metadata. This may be performed in accordance with one or more of operations 1230, 1240, 1250, 1260, and 1270, any one or more of which may be performed as part (e.g., a precursor task, a subroutine, or a portion) of operation 1220.

In operation 1230, the content source selector 1120 generates a search query based on the content source and the rights metadata. The content source selector 1120 may construct a query for content referenced by a title or artist specified by the rights metadata. The content source selector 1120 may construct a query that searches posts via a title field, a description field, in the comments, etc. The content source selector 1120 may construct the query specific to the content source or to a search engine that indexes a set of repositories that includes the content source.

In operation 1240, the content source selector 1120 retrieves a candidate list from the content source. The candidate list may form part of search results retrieved from the content source executing one or more queries sent by the content source selector 1120. The candidate list may include metadata identifying one or more audio pieces or the audio piece themselves.

In operation 1250, the audio identification machine controller 1140 selects a subset of a catalog of audio content stored in database 115 based on the rights metadata. In various embodiments, the audio content stored in database 115 may be partitioned, for example, according to artist, publisher, or some other suitable collection. These partitions (or buckets) allow audio identification to proceed according to a limited subset of reference audio. This improves identification speed requiring fewer comparisons to be performed. Accordingly, the rights metadata can be used to seed which partition of reference audio to use for audio fingerprinting comparisons with audio pieces identified in the candidate list.

In operation 1260, the audio identification machine controller 1140 compares audio content associated with the candidate list to the selected subset of the catalog. The audio identification machine controller 1140 may retrieve each piece of audio content identified in the candidate list and forward the audio content to the audio identification machine 110. Alternatively, the audio identification machine controller 1140 may forward the candidate list to the audio identification machine 110 enabling the audio identification machine 110 to retrieve each piece of audio content for identification.

In operation 1270, the audio identification machine controller 1140 identifies potential matches. For each piece of audio content, the audio identification machine controller 1140 may receive from the audio identification machine 110 a ranked or weighted list of songs for which the piece of audio content may be a cover song. The audio identification machine controller 1140 may select the highest ranked song as a potential match. The audio identification machine controller 1140 may identify a match if a ranking or weight exceeds a predetermined threshold.

In operation 1280, the user interface and reporting controller 1150 generates a notification that a query audio is a cover of a reference audio. For each matching protected work, the user interface and reporting controller 1150 may identify a piece of audio content, its content source, and information about a user that uploaded or is hosting the audio content. The user interface and reporting controller 1150 may initiate one or more workflows through the notification allowing human verification and handling of any legal necessities of an unlicensed work.

Figure 13:
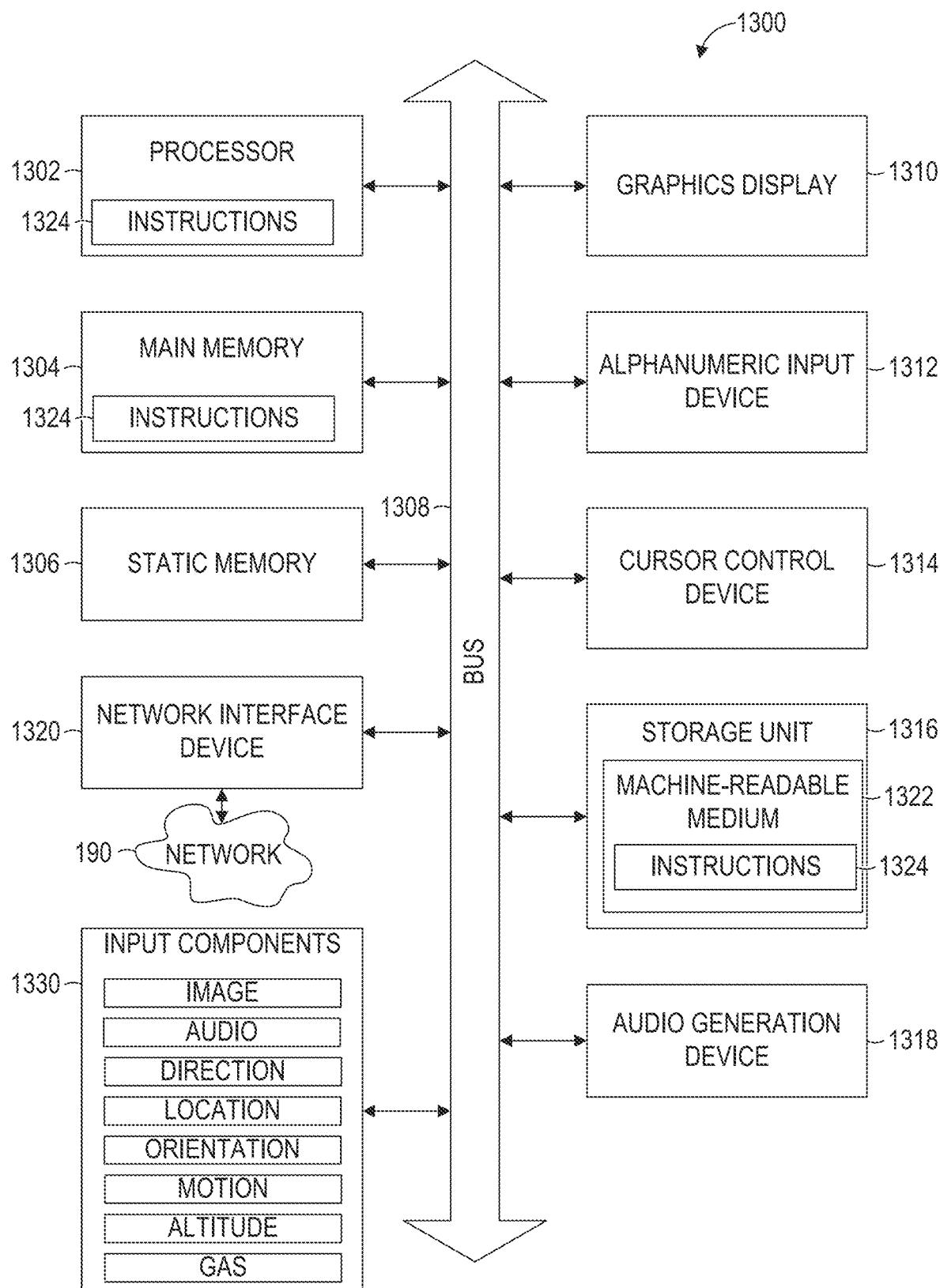
FIG. 13 is a block diagram illustrating components of a machine, according to some example embodiments, able to read instructions from a machine-readable medium and perform any one or more of the methodologies discussed herein.

FIG. 13 is a block diagram illustrating components of a machine 1300, according to some example embodiments, able to read instructions 1324 from a machine-readable medium 1322 (e.g., a non-transitory machine-readable medium, a machine-readable storage medium, a computer-readable storage medium, or any suitable combination thereof) and perform any one or more of the methodologies discussed herein, in whole or in part. Specifically, FIG. 13 shows the machine 1300 in the example form of a computer system (e.g., a computer) within which the instructions 1324 (e.g., software, a program, an application, an applet, an app, or other executable code) for causing the machine 1300 to perform any one or more of the methodologies discussed herein may be executed, in whole or in part.

In alternative embodiments, the machine 1300 operates as a standalone device or may be communicatively coupled (e.g., networked) to other machines. In a networked deployment, the machine 1300 may operate in the capacity of a server machine or a client machine in a server-client network environment, or as a peer machine in a distributed (e.g., peer-to-peer) network environment. The machine 1300 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1324, sequentially or otherwise, that specify actions to be taken by that machine. Further, while only a single machine is illustrated, the term "machine" shall also be taken to include any collection of machines that individually or jointly execute the instructions 1324 to perform all or part of any one or more of the methodologies discussed herein.

The machine 1300 includes a processor 1302 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1304, and a static memory 1306, which are configured to communicate with each other via a bus 1308. The processor 1302 contains solid-state digital microcircuits (e.g., electronic, optical, or both) that are configurable, temporarily or permanently, by some or all of the instructions 1324 such that the processor 1302 is configurable to perform any one or more of the methodologies described herein, in whole or in part. For example, a set of one or more microcircuits of the processor 1302 may be configurable to execute one or more modules (e.g., software modules) described herein. In some example embodiments, the processor 1302 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1300 with at least the processor 1302, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1300 may further include a graphics display 1310 (e.g., a plasma display panel (PDP), a light emitting diode (LED) display, a liquid crystal display (LCD), a projector, a cathode ray tube (CRT), or any other display capable of displaying graphics or video). The machine 1300 may also include an alphanumeric input device 1312 (e.g., a keyboard or keypad), a pointer input device 1314 (e.g., a mouse, a touchpad, a touchscreen, a trackball, a joystick, a stylus, a motion sensor, an eye tracking device, a data glove, or other pointing instrument), a data storage 1316, an audio generation device 1318 (e.g., a sound card, an amplifier, a speaker, a headphone jack, or any suitable combination thereof), and a network interface device 1320.

The data storage 1316 (e.g., a data storage device) includes the machine-readable medium 1322 (e.g., a tangible and non-transitory machine-readable storage medium) on which are stored the instructions 1324 embodying any one or more of the methodologies or functions described herein. The instructions 1324 may also reside, completely or at least partially, within the main memory 1304, within the static memory 1306, within the processor 1302 (e.g., within the processor's cache memory), or any suitable combination thereof, before or during execution thereof by the machine 1300. Accordingly, the main memory 1304, the static memory 1306, and the processor 1302 may be considered machine-readable media (e.g., tangible and non-transitory machine-readable media). The instructions 1324 may be transmitted or received over the network 190 via the network interface device 1320. For example, the network interface device 1320 may communicate the instructions 1324 using any one or more transfer protocols (e.g., hypertext transfer protocol (HTTP)).

In some example embodiments, the machine 1300 may be a portable computing device (e.g., a smart phone, a tablet computer, or a wearable device), and may have one or more additional input components 1330 (e.g., sensors or gauges). Examples of such input components 1330 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1324 for execution by the machine 1300, such that the instructions 1324, when executed by one or more processors of the machine 1300 (e.g., processor 1302), cause the machine 1300 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1324 for execution by the machine 1300 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1324).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. An apparatus comprising:
   memory; and
   one or more processors to execute instructions to:
      identify query audio from a content source based on a search query using rights metadata associated with the query audio;
      execute a constant Q transform on query time slices of the query audio;
      binarize the constant Q transformed query time slices;
      execute a two-dimensional Fourier transform on query time windows within the binarized and constant Q transformed query time slices to generate two-dimensional Fourier transforms of the query time windows;
      generate a query data structure based on a sequential order of the two-dimensional Fourier transforms;
      select a subset of a reference database based on the rights metadata, the subset including reference audio; and
      identify the query audio as a cover rendition of the reference audio based on a comparison between the query data structure and a reference data structure associated with the reference audio.

2. The apparatus of claim 1, wherein the rights metadata includes at least one of an artist, a publisher, license information, right holder information, royalty information, or a title of the query audio, and the one or more processors are to:
 obtain the reference audio via a user interface in communication with a network; and
 register the reference audio based on a first storage of the reference audio in the reference database and a second storage of the rights metadata in a rights database.

3. The apparatus of claim 1, wherein the content source is at least one of (i) a stream of a live broadcast, (ii) a music sharing site, (iii) a video sharing site, or (iv) a social networking feed, a post, update, or a tweet of a social network.

4. The apparatus of claim 1, wherein the one or more processors are to select the content source based on at least one of information provided by a right holder associated with the query audio, the rights metadata, a popularity of the query content source, or a likelihood of the query content source having potentially unlicensed cover songs.

5. The apparatus of claim 1, wherein the one or more processors are to:
 execute a constant Q transform on reference time slices of the reference audio;
 binarize the constant Q transformed reference time slices;
 execute a two-dimensional Fourier transform on reference time windows within the binarized and constant Q transformed reference time slices to generate two-dimensional Fourier transforms of the reference time windows; and
 generate the reference data structure by sequentially ordering the two-dimensional Fourier transforms of the reference time windows.

6. The apparatus of claim 1, wherein the one or more processors are to:
 generate a similarity matrix that indicates degrees to which reference portions of the reference data structure are similar to query portions of the query data structure;
 compute a distance measure between the query data structure and the reference data structure based on the similarity matrix; and
 store an association in a database between the reference audio and the query audio based on a computed distance measure, the association identifying the query audio as the cover rendition.

7. The apparatus of claim 6, wherein the one or more processors are to:
 convolve the similarity matrix with a checkerboard kernel to generate a first convolved similarity matrix, the first convolved similarity matrix including positive elements and negative elements; and
 replace the negative elements with zeros to generate a second convolved similarity matrix; and wherein:
 the computing of the distance measure between the query data structure and the reference data structure is based on the second convolved similarity matrix.

8. The apparatus of claim 1, wherein the one or more processors are to:
 group the binarized and constant Q transformed query time slices of the query audio into the query time windows prior to the executing of the two-dimensional Fourier transform on the query time windows, the query time windows including overlapping query time windows of uniform duration; and
 apply a blur algorithm to the two-dimensional Fourier transforms of the query time windows prior to the sequential ordering of the two-dimensional Fourier transforms in the query data structure.

9. A non-transitory machine-readable medium comprising instructions that, when executed, cause one or more processors to at least:
 identify query audio from a content source based on a search query using rights metadata associated with the query audio;
 execute a constant Q transform on query time slices of the query audio;
 binarize the constant Q transformed query time slices;
 execute a two-dimensional Fourier transform on query time windows within the binarized and constant Q transformed query time slices to generate two-dimensional Fourier transforms of the query time windows;
 generate a query data structure based on a sequential order of the two-dimensional Fourier transforms;
 select a subset of a reference database based on the rights metadata, the subset including reference audio; and
 identify the query audio as a cover rendition of the reference audio based on a comparison between the query data structure and a reference data structure associated with the reference audio.

10. The non-transitory machine-readable medium of claim 9, wherein the rights metadata includes at least one of an artist, a publisher, license information, right holder information, royalty information, or a title of the query audio, and the instructions, when executed, cause the one or more processors to:
 obtain the reference audio via a user interface in communication with a network; and
 register the reference audio based on a first storage of the reference audio in the reference database and a second storage of the rights metadata in a rights database.

11. The non-transitory machine-readable medium of claim 9, wherein the content source is at least one of (i) a stream of a live broadcast, (ii) a music sharing site, (iii) a video sharing site, or (iv) a social networking feed, a post, update, or a tweet of a social network.

12. The non-transitory machine-readable medium of claim 9, wherein the instructions, when executed, cause the one or more processors to select the content source based on at least one of information provided by a right holder associated with the query audio, the rights metadata, a popularity of the query content source, or a likelihood of the query content source having potentially unlicensed cover songs.

13. The non-transitory machine-readable medium of claim 9, wherein the instructions, when executed, cause the one or more processors to:
 execute a constant Q transform on reference time slices of the reference audio;
 binarize the constant Q transformed reference time slices;
 execute a two-dimensional Fourier transform on reference time windows within the binarized and constant Q transformed reference time slices to generate two-dimensional Fourier transforms of the reference time windows; and
 generate the reference data structure by sequentially ordering the two-dimensional Fourier transforms of the reference time windows.

14. The non-transitory machine-readable medium of claim 9, wherein the instructions, when executed, cause the one or more processors to:
 generate a similarity matrix that indicates degrees to which reference portions of the reference data structure are similar to query portions of the query data structure;

compute a distance measure between the query data structure and the reference data structure based on the similarity matrix; and store an association in a database between the reference audio and the query audio based on a computed distance measure, the association identifying the query audio as the cover rendition.

15. The non-transitory machine-readable medium of claim 14, wherein the instructions, when executed, cause the one or more processors to:

convolve the similarity matrix with a checkerboard kernel to generate a first convolved similarity matrix, the first convolved similarity matrix including positive elements and negative elements; and replace the negative elements with zeros to generate a second convolved similarity matrix; and wherein:

the computing of the distance measure between the query data structure and the reference data structure is based on the second convolved similarity matrix.

16. The non-transitory machine-readable medium of claim 9, wherein the instructions, when executed, cause the one or more processors to:

group the binarized and constant Q transformed query time slices of the query audio into the query time windows prior to the executing of the two-dimensional Fourier transform on the query time windows, the query time windows including overlapping query time windows of uniform duration; and apply a blur algorithm to the two-dimensional Fourier transforms of the query time windows prior to the sequential ordering of the two-dimensional Fourier transforms in the query data structure.

17. A method comprising:

identifying, using one or more processors, query audio from a content source based on a search query using rights metadata associated with the query audio;

executing, using the one or more processors, a constant Q transform on query time slices of the query audio;

binarizing, using the one or more processors, the constant Q transformed query time slices;

executing, using the one or more processors, a two-dimensional Fourier transform on query time windows within the binarized and constant Q transformed query time slices to generate two-dimensional Fourier transforms of the query time windows;

generating, using the one or more processors, a query data structure based on a sequential order of the two-dimensional Fourier transforms;

selecting, using the one or more processors, a subset of a reference database based on the rights metadata, the subset including reference audio; and identifying, using the one or more processors, the query audio as a cover rendition of the reference audio based on a comparison between the query data structure and a reference data structure associated with the reference audio.

18. The method of claim 17, wherein the rights metadata includes at least one of an artist, a publisher, license information, right holder information, royalty information, or a title of the query audio, and further including:

obtaining the reference audio via a user interface in communication with a network; and registering the reference audio based on storing the reference audio in the reference database and storing the rights metadata in a rights database.

19. The method of claim 17, wherein the content source is at least one of (i) a stream of a live broadcast, (ii) a music sharing site, (iii) a video sharing site, or (iv) a social networking feed, a post, update, or a tweet of a social network.

20. The method of claim 17, wherein the one or more processors are to select the content source based on at least one of information provided by a right holder associated with the query audio, the rights metadata, a popularity of the query content source, or a likelihood of the query content source having potentially unlicensed cover songs.

21. The method of claim 17, further including:

executing a constant Q transform on reference time slices of the reference audio;

binarizing the constant Q transformed reference time slices;

executing a two-dimensional Fourier transform on reference time windows within the binarized and constant Q transformed reference time slices to generate two-dimensional Fourier transforms of the reference time windows; and generating the reference data structure by sequentially ordering the two-dimensional Fourier transforms of the reference time windows.

22. The method of claim 17, further including:

generating a similarity matrix that indicates degrees to which reference portions of the reference data structure are similar to query portions of the query data structure;

computing a distance measure between the query data structure and the reference data structure based on the similarity matrix; and storing an association in a database between the reference audio and the query audio based on a computed distance measure, the association identifying the query audio as the cover rendition.

23. The method of claim 22, further including:

convolving the similarity matrix with a checkerboard kernel to generate a first convolved similarity matrix, the first convolved similarity matrix including positive elements and negative elements; and replacing the negative elements with zeros to generate a second convolved similarity matrix; and wherein:

the computing of the distance measure between the query data structure and the reference data structure is based on the second convolved similarity matrix.

24. The method of claim 17, further including:

grouping the binarized and constant Q transformed query time slices of the query audio into the query time windows prior to the executing of the two-dimensional Fourier transform on the query time windows, the query time windows including overlapping query time windows of uniform duration; and applying a blur algorithm to the two-dimensional Fourier transforms of the query time windows prior to the sequential ordering of the two-dimensional Fourier transforms in the query data structure.

* * * * *